(12) United States Patent
Yufik

(10) Patent No.: US 7,831,472 B2
(45) Date of Patent: Nov. 9, 2010

(54) METHODS AND SYSTEM FOR SEARCH ENGINE REVENUE MAXIMIZATION IN INTERNET ADVERTISING

(76) Inventor: Yan M. Yufik, 12204 St. James Rd., Potomac, MD (US) 20854

( * ) Notice: Subject to any disclaimer, the term of this patent is extended or adjusted under 35 U.S.C. 154(b) by 457 days.

(21) Appl. No.: 11/507,570

(22) Filed: Aug. 22, 2006

(65) Prior Publication Data
US 2008/0052152 A1     Feb. 28, 2008

(51) Int. Cl.
G06Q 30/00     (2006.01)
G05B 19/418    (2006.01)
(52) U.S. Cl. .................... 705/14.4; 705/26; 705/37; 707/723
(58) Field of Classification Search .................... 705/14, 705/14.4, 14.6, 37, 26; 707/6, 5, 723, 3, 707/1
See application file for complete search history.

(56) References Cited

U.S. PATENT DOCUMENTS

| | | | |
|---|---|---|---|
| 5,586,219 A | 12/1996 | Yufik | |
| 5,794,224 A | 8/1998 | Yufik | |
| 6,070,160 A | 5/2000 | Geary | |
| 6,098,065 A | 8/2000 | Skillen et al. | |
| 6,144,944 A | 11/2000 | Kurtzman et al. | |
| 6,285,999 B1 | 9/2001 | Page | |
| 6,363,377 B1 * | 3/2002 | Kravets et al. | 707/4 |
| 6,421,675 B1 | 7/2002 | Ryan et al. | |
| 6,526,440 B1 | 2/2003 | Bharat | |

(Continued)

OTHER PUBLICATIONS

Chen et al. Discovering conceptual page hierarchy of a web site from user traversal history, ADMA 2005 : advanced data mining and applications : (Wuhan, Jul. 22-24, 2005 ) International conference on advanced data mining and applications No. 1, Wuhan , CHINE (Jul. 22, 2005) 2005, vol. 3584, pp. 536-543.*

(Continued)

*Primary Examiner*—John G Weiss
*Assistant Examiner*—M. Victoria Vanderhorst
(74) *Attorney, Agent, or Firm*—Cahn & Samuels LLP; William E. Bradley

(57) ABSTRACT

A method for improving Search Engine revenues from advertisements by selecting and displaying advertisements from a portfolio of advertisements that are likely to attract user traffic while maximizing the expected Search Engine revenues. Conventionally, each sponsored advertisement in the Search Engine portfolio is associated with one or more keywords from a list of advertiser sponsored keywords, such that if a user enters a keyword contained in an advertisement in the portfolio, a corresponding sponsored link is displayed. According to this invention, in addition to the sponsored links, complementary links can be displayed to some of the paid advertisements containing none of the user-entered keywords. The method for computing the complementary links is based on "overlapping queries" and "overlapping intent" models. With the help of such models, integrated search histories are represented as an associative network, in which associative probabilities for the entire list of keywords and the entire portfolio of advertisements are stored and updated according to the actions of all users, such that each user's input during a given search session becomes part of the overall record of searches, and is thus used to optimize all future searches. In a particular search session, the associative probabilities are used to compute revenue-maximizing combinations of complementary links and displaying such combinations in addition to the sponsored links.

14 Claims, 17 Drawing Sheets

U.S. PATENT DOCUMENTS

| | | |
|---|---|---|
| 6,678,681 B1 | 1/2004 | Brin |
| 6,714,975 B1 | 3/2004 | Aggarwal et al. |
| 6,718,324 B2 | 4/2004 | Edlund et al. |
| 6,732,088 B1 | 5/2004 | Glance |
| 6,754,873 B1 | 6/2004 | Law et al. |
| 6,816,857 B1 | 11/2004 | Weissman et al. |
| 6,907,566 B1 | 6/2005 | McElfresh |
| 6,963,874 B2 | 11/2005 | Kasriel et al. |
| 6,970,835 B1* | 11/2005 | Forward .................. 705/14 |
| 7,007,074 B2 | 2/2006 | Radwin |
| 7,725,464 B2* | 5/2010 | Grubb et al. .............. 707/723 |
| 2002/0099700 A1 | 7/2002 | Li |
| 2002/0123912 A1* | 9/2002 | Subramanian et al. ......... 705/5 |
| 2002/0123988 A1 | 9/2002 | Dean et al. |
| 2002/0152200 A1 | 10/2002 | Krichilsky et al. |
| 2003/0220920 A1 | 11/2003 | Lake et al. |
| 2004/0015397 A1 | 1/2004 | Barry et al. |
| 2004/0044571 A1 | 3/2004 | Bronnimann et al. |
| 2004/0059708 A1* | 3/2004 | Dean et al. .................... 707/1 |
| 2004/0068697 A1 | 4/2004 | Harik et al. |
| 2004/0093327 A1 | 5/2004 | Anderson et al. |
| 2004/0098287 A1* | 5/2004 | Young et al. .................. 705/5 |
| 2004/0236737 A1 | 11/2004 | Weissman et al. |
| 2004/0255237 A1 | 12/2004 | Tong |
| 2004/0267723 A1 | 12/2004 | Bharat |
| 2004/0267806 A1 | 12/2004 | Lester |
| 2005/0004930 A1 | 1/2005 | Hatta |
| 2005/0021397 A1 | 1/2005 | Cui et al. |
| 2005/0033641 A1 | 2/2005 | Jha et al. |
| 2005/0055341 A1 | 3/2005 | Haahr et al. |
| 2005/0060311 A1 | 3/2005 | Tong |
| 2005/0071325 A1 | 3/2005 | Bem |
| 2005/0071741 A1 | 3/2005 | Acharya et al. |
| 2005/0131762 A1 | 6/2005 | Bharat et al. |
| 2005/0144065 A1* | 6/2005 | Calabria et al. ................ 705/14 |
| 2005/0144073 A1 | 6/2005 | Morrisroe et al. |
| 2005/0149499 A1 | 7/2005 | Franz et al. |
| 2005/0222989 A1* | 10/2005 | Haveliwala et al. ............ 707/3 |
| 2006/0005113 A1 | 1/2006 | Baluja et al. |
| 2006/0020593 A1 | 1/2006 | Ramsaier et al. |
| 2006/0020596 A1* | 1/2006 | Liu et al. ....................... 707/6 |
| 2006/0026147 A1 | 2/2006 | Cone et al. |
| 2006/0036577 A1 | 2/2006 | Knighton et al. |
| 2006/0064411 A1 | 3/2006 | Gross et al. |
| 2006/0069612 A1 | 3/2006 | Hurt et al. |
| 2006/0069616 A1 | 3/2006 | Bau |
| 2006/0069618 A1 | 3/2006 | Milener et al. |

OTHER PUBLICATIONS

Mitra et al, "Improving Automatic Query Expansion", SIGIR '98.
Ruthven, "Re-examining the Potential Effectiveness of Interactive Query Expansion", SIGIR '03.
Berger et al, "Bridging the Lexical Chasm: Statistical Approaches to Answer-Finding", SIGIR 2000.
Calishairn et al, "Google Hacks, Second Ed.", pp. 1-27.
Mordkovich et al, "Pay-Per-Click Search Engine Marketing Handbook" (2005), pp. 1-27.
Berry et al, "Understanding Search Engines—Mathematical Modeling and Text Retrieval" (1999), pp. 47-71.
Glossbrenner et al, "Search Engines for the World Wide Web, $2^{nd}$ Edition" (1999), pp. 3-31.
Sonnenreich et al, "Web Development.com Guide to Search Engines", (1998), pp. 15-67.
Seda, Search Engine Advertising—Buying your Way to the top to Increase Sales(2004), pp. 11-149.
Smeaton et al, "The retrieval effects of query expansions on a feedback document retrieval system", *Computer Journal* 26(3), pp. 239-246.

* cited by examiner

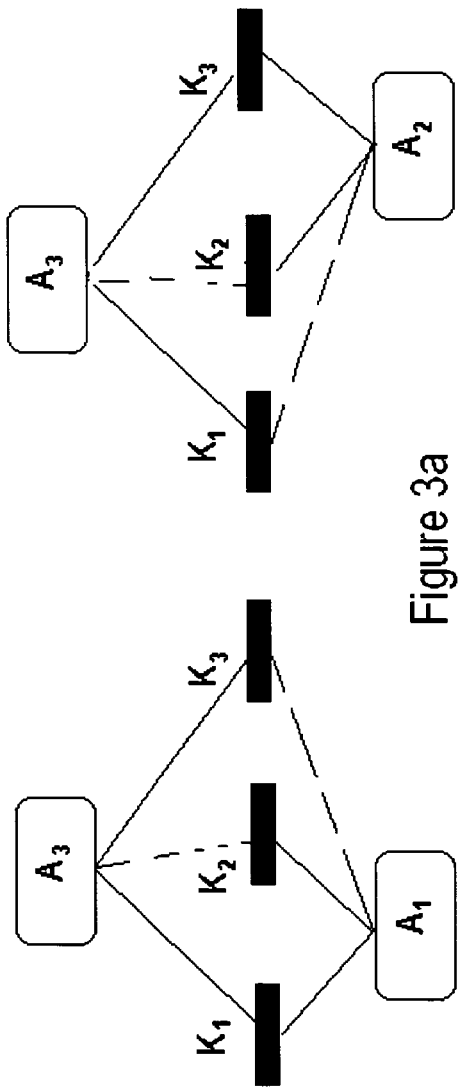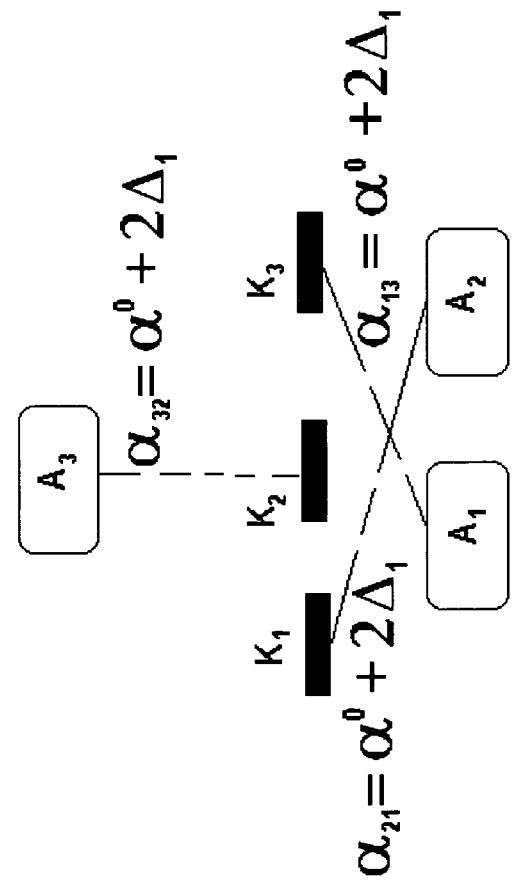
Figure 3a
Figure 3b

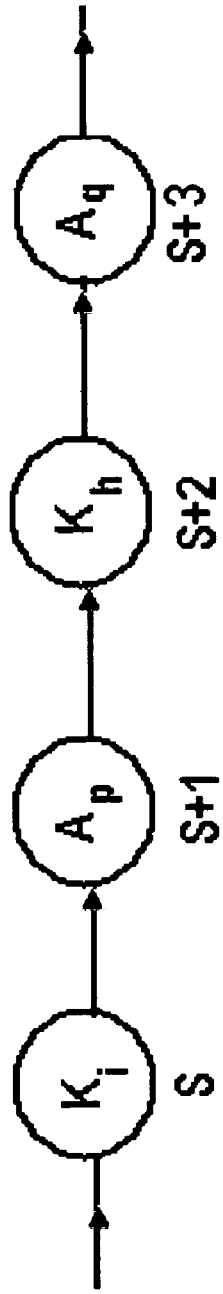
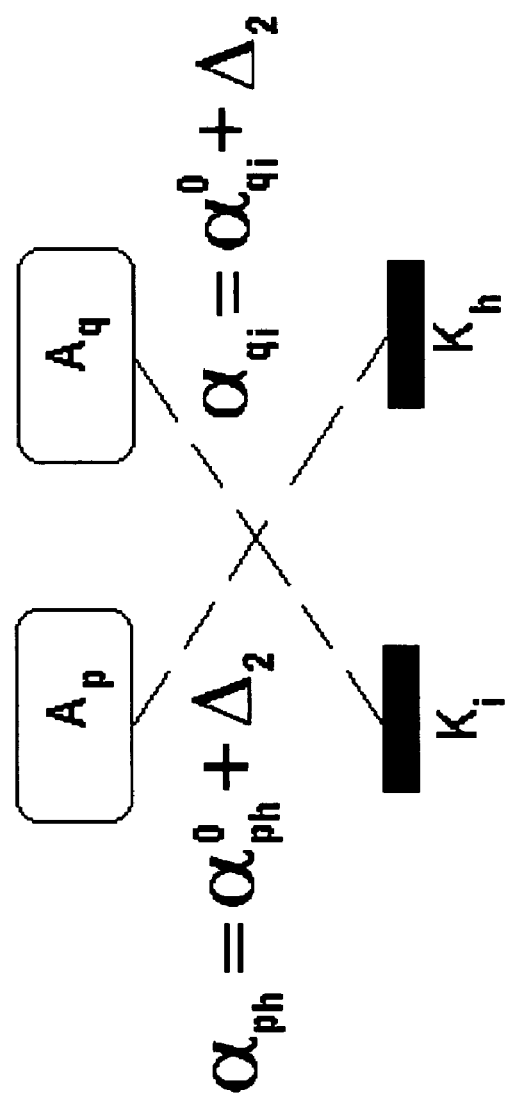
Figure 4a
Figure 4b

| $A/K$ | $K_1$ | $K_2$ | $K_3$ |
|---|---|---|---|
| $A_1$ | $\alpha_{11}$ | $\alpha_{12}$ | $\alpha_{13}$ |
| $A_2$ | $\alpha_{21}$ | $\alpha_{22}$ | $\alpha_{23}$ |
| $A_3$ | $\alpha_{31}$ | $\alpha_{32}$ | $\alpha_{33}$ |

$M \times N$ $$R(K_i) = \sum_{j=1}^{w \leq W} PPV(A_j)\alpha_{ij}\,\delta_{ij} \to \max$$

$$\delta_{ij} = 0, 1$$

Figure 5.

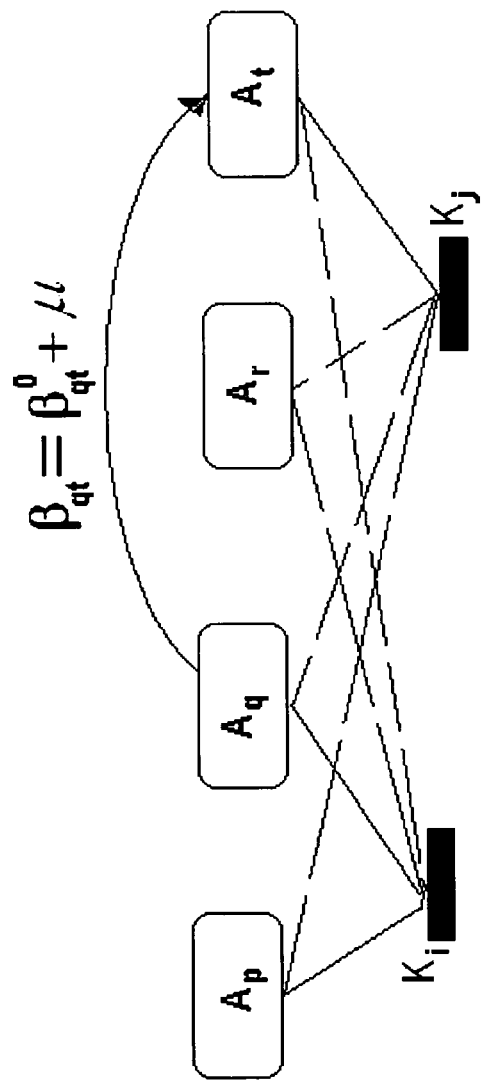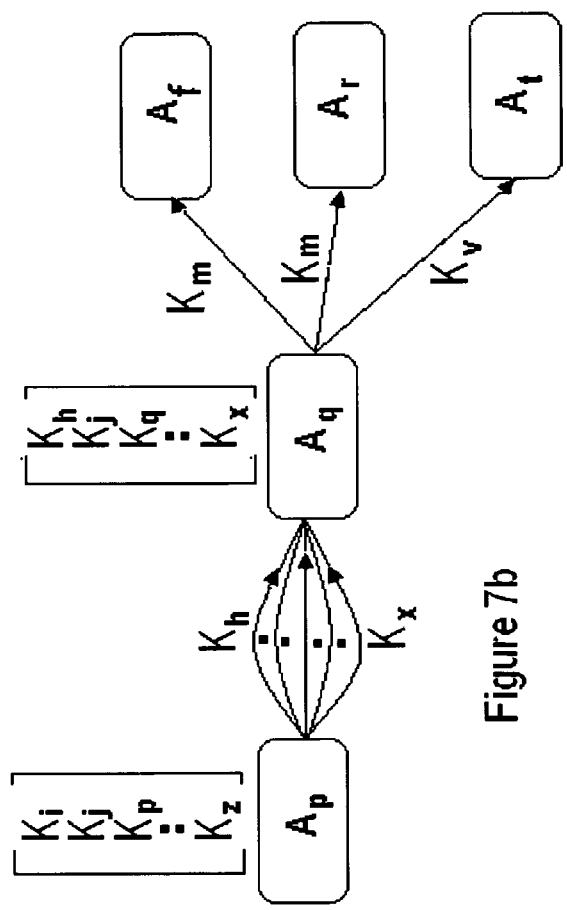
Figure 7a
Figure 7b $M \times N$

| A/K | $K_1$ | $K_2$ | $K_3$ |
|---|---|---|---|
| $A_1$ | $\alpha_{11}$ | $\alpha_{12}$ | $\alpha_{13}$ |
| $A_2$ | $\alpha_{21}$ | $\alpha_{22}$ | $\alpha_{23}$ |
| $A_3$ | $\alpha_{31}$ | $\alpha_{32}$ | $\alpha_{33}$ |

Figure 9a

| $K_2$ | $A_1$ | $A_2$ | $A_3$ |
|---|---|---|---|
| $A_1$ | $F_1^{k_2}$ | | |
| $A_2$ | $f_{21}^{k_2}$ | $F_2^{k_2}$ | |
| $A_3$ | $f_{31}^{k_2}$ | | $F_3^{k_2}$ |

Figure 9b

METHODS AND SYSTEM FOR SEARCH ENGINE REVENUE MAXIMIZATION IN INTERNET ADVERTISING

FIELD OF THE INVENTION

This invention relates to improvement of revenue earned by Search Engine Advertisement Providers on the Internet, who are effectively paid based on the frequency of selection of the advertisements presented to users for view (the "click-through rate"), by providing improved methods of selecting advertisements to present during a given search. More specifically, search engine advertising revenues are improved according to the invention by matching keywords entered by a user in the current session against the integrated history of prior searches, in order to identify and display "complementary" advertisement links that are likely to be of interest to the user, these containing no keywords but offering sufficiently high click-through and/or conversion probabilities to be worthy of display on the user's screen.

BACKGROUND AND SUMMARY OF THE INVENTION

Revenues of Search Engine Advertisement Providers ("Providers") are determined by the number of user visits (clicks or viewings) received by paid advertisements, and/or by per-visit-amounts (Pay-Per-Visit, or PPV) the Advertiser pays to the provider. The business model is well described in Mordkovich et al, *Pay-per-Click Search Engine Marketing Handbook*(2005). More specifically, typical advertisement contracts between Advertisers and Providers specify lists of keywords; the Provider provides software running in conjunction with the Search Engine, such that the Search Engine displays "links" to corresponding paid advertisements ("sponsored links"), that is, displays an advertisement on which the user can click to explore further, whenever such keywords appear in the user query. Such keyword-based advertising suffers from inherent revenue losses when advertisements containing the keywords are displayed but fail to attract the user's attention and, more significantly, by failing to display advertisements that are potentially attractive to users despite containing none of the presently entered keywords. Thus, it would be desirable to provide a means for identifying and displaying advertisements that are likely to be of interest to the user, and thus attract his or her attention, despite the fact that the advertisement does not correspond to any of the keywords entered per se.

According to the present invention such inherent revenue losses are reduced by identifying advertisements likely to be relevant in the ongoing search and appending the corresponding "complementary links" to the contractually mandated "sponsored links" in the search output. The invention takes advantage of the fact that, due to deficiencies inherent in keyword-based searching, consecutive user queries often have the same or overlapping underlying objectives despite different keywords; that is, the invention recognizes that often a user will not find what he or she is looking for in a particular search and will start over with different keywords. According to this aspect of the invention, a series of searches are collectively examined to identify and display complementary links to advertisements likely to be of interest to the user. For example, the user's selection of a result identified in the search output, for example, by clicking on an advertisement, indicates that the link may be relevant not only to the present search but also to searches preceding and following the present one in the search session. Accordingly, for example, the keywords from the preceding and subsequent searches can all be used to select the most relevant advertisements for display.

The invention is not limited to display of advertisements alone, although that is the context in which it will be described in detail. More specifically, similar techniques can be used according to the invention to improve Web searching per se; that is, the techniques described in detail below to identify and display advertisements that are likely to be of interest to a searcher can also be used to improve Web searching generally.

According to this invention, the interaction between the Search Engine and a user is modeled by a Finite State Probabilistic Automaton operated by the Provider and enabling the Provider to identify and display complementary links to advertisements. The Automaton has the capability of calculating the probability of relevance of possible advertisements from the histories of past searches conducted by multiple past users. Given the sequence of user inputs in the current session, the Automaton identifies and displays complementary links that are likely to satisfy user search objectives and thus maximize search engine revenues.

PRIOR ART

Review of a series of U.S. patents and published patent applications assigned to Google identified the following to be of some relevance to the present invention:

| | |
|---|---|
| Page | 6,285,999 |
| Bharat | 6,526,440 |
| Cui et al. | 2005/0021397 |
| Acharya et al. | 2005/0071741 |
| Law et al | 6,754,873 |
| Bronnimann et al. | 2004/0044571 |
| Brin | 6,678,681 |
| Dean et al. | 2002/0123988 |
| Dean at al | 2004/0059708 |
| Barry et al | 2004/0015397 |
| Harik et al | 2004/0068697 |
| Anderson et al | 2004/0093327 |
| Kasriel et al | 6,963,874 |
| Ryan et al | 6,421,675 |
| Weissman et al | 2004/0236737A1 |
| Tong | 2004/0255237A1 |
| Bharat | 2004/0267723A1 |
| Lester | 2004/0267806A1 |
| Hauler et al | 2005/0055341A1 |
| Tong | 2005/060310A1 |
| Tong et al | 2005/060311A1 |
| Bem | 2005/0071325A1 |
| Franz et al | 2005/0149499A1 |
| Forward | 6,970,835 |
| Kurtzman et al | 6,144,944 |
| McElfresh et al | 6,907,566 |

The following US patents and published applications were identified to be generally relevant to the subject matter of the invention:

Geary U.S. Pat. No. 6,070,160

Skillen U.S. Pat. No. 6,098,065

Aggarwal U.S. Pat. No. 6,714,975

Edlund et al U.S. Pat. No. 6,718,324

Glance U.S. Pat. No. 6,732,088

Radwin U.S. Pat. No. 7,007,074

Li 2002/0099700

Krichilsky et al 2002/0152200

Lake et al 2003/0220920

Hatta 2005/0004930

Jha et al 2005/0033641

Bharat 2005/0131762

Morrisroe et al 2005/0144073

Haveliwala et al 2005/0222989

Baluja et al 2006/0005113

Ramsaier et al 2006/0020593

Cone et al 2006/0026147

Knighton et al 2006/0036577

Gross et al 2006/0064411

Hurt et al 2006/0069612

Bau 2006/0069616

Milener et al 2006/0069618

In addition, the inventor's own patents U.S. Pat. Nos. 5,794,224 and 5,586,219 are generally relevant to self-adaptive neural networks as used for a variety of purposes.

Other relevant sources: Seda, C., *Search Engine Advertising. Buying Your Way to the Top to Increase Sales*, New Riders, CA. 2004; pp. 11-149, Calisshain, T., et al., *Google Hacks. Tips and Tools for Smarter Searching*, O'Reilly Media, Inc. Cambridge. 2004, pp. 1-27; Mordkovich, et al. *Pay-Per-Click Search Engine Marketing Handbook*, MordComm Inc. NY. 2005, pp 1-27; Berry, M. W et al., *Understanding Search Engines. Mathematical Modeling and Text Retrieval*, SIAM. 1999, pp 47-70; Glossbrenner, A., Glossbrenner, E. 1999, *Search Engines for the World Wide Web*. Peachpit Press, CA, pp 3-31; Sonnerich, W., Macinta, T. 1998, *Guide to Search Engines*. Wiley, NY, pp. 12-67; Mitra, M., Singhal, A., Buckley, C. 1998. "Improving automatic query expansion", Proc. ACM SIGIR 98, Research and Development in Information Retrieval, pp. 206-214; Ruthven, I. 2003, "Re-examining the potential effectiveness of interactive query expansion", Proc. 26th Annual ACM International Conf on R&D in Information Retrieval. Toronto, Canada; Smeaton, A. F., Rijsbergen, C. J. 1983. "The retrieval effects of query expansion on a feedback document retrieval system", The Computer Journal, 26(3), pp. 239-246; Berger, A., Caruana, R., Cole, D., Freitag, D., and Mittal, V., 2000, "Bridging the Lexical Chasm: Statistical Approaches to Answer Finding", Proc. Int. Conf. Research and Development in Information Retrieval, pp. 192-199.

BRIEF DESCRIPTION OF THE DRAWINGS

The invention will be better understood by reference to the accompanying drawings, in which:

FIG. 2, comprising

FIG. 3, comprising FIGS. 3*a* and 3*b*, shows schematically how complementary links are determined responsive to the existence of overlaps;

FIG. 4, comprising FIGS. 4*a* and 4*b*, shows schematically how the series of steps followed by a user in the process of searching can be used to form complementary links and incrementing link probabilities;

FIG. 5 shows schematically a matrix of query satisfaction probabilities, organized by Advertisement and Keyword;

FIG. 6, comprising

FIG. 7, comprising FIGS. 7*a* and 7*b*, shows schematically how transition between two states of the Automaton in response to the user's input of a keyword establishes a probabilistic connection between those states;

FIG. 8, comprising

FIG. 9, comprising FIGS. 9*a* and 9*b*, shows schematically the mapping of CLP data onto the History Graph;

FIG. 10, comprising

DETAILED DESCRIPTION OF THE INVENTION

Figure 1:
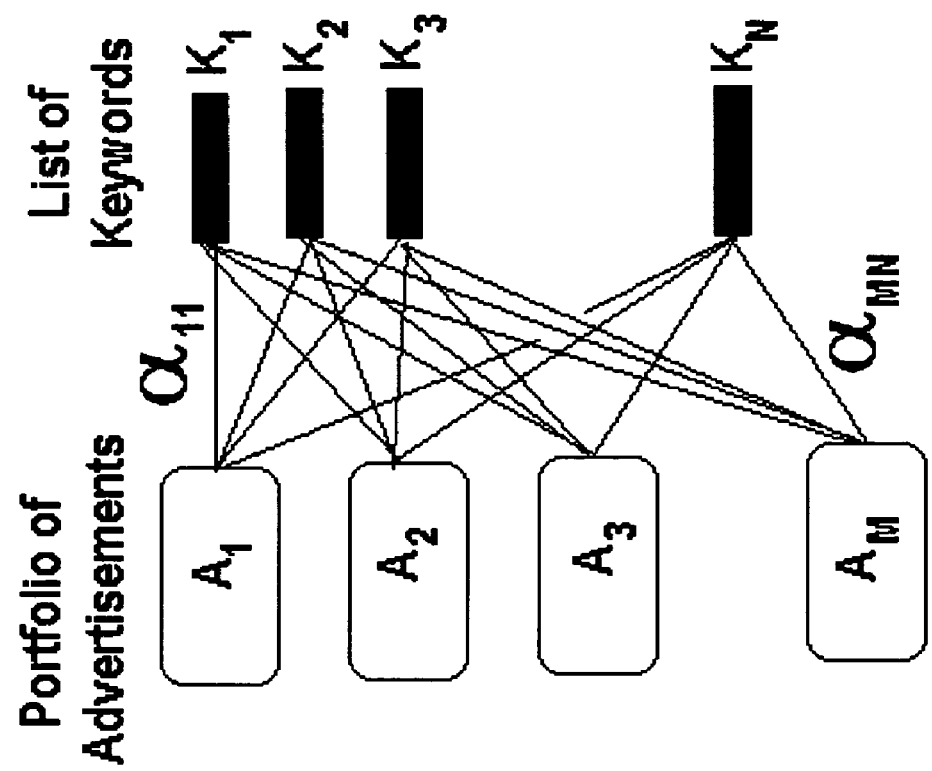
FIG. 1 shows schematically the relationship between a Portfolio of Advertisements and a List of Sponsored Keywords.

Search Engines are instrumental in two interrelated but different activities: information seeking and shopping. Those activities serve different purposes and elicit different patterns of user behavior. Shopping employing the Internet, which tends to involve shoppers trying various combinations of keywords to locate a specific intended item, differs from shopping in a physical store, where related goods tend to be located near one another, encouraging the shopper to go beyond his or her original intention.

More specifically, in a physical store, shoppers often start with a general need, having no definite items in mind (e.g., "need clothing and stuff for the summer vacation"). Second, shoppers can be unaware of the appropriate merchandise or fail to consider it during shopping (e.g., "didn't think to look for sun screen lotion"). Third, purchasing decisions are often opportunistic, i.e., unrelated to the original intent (e.g., "this sweater was on sale"). Fourth, purchasing an item often stimulates purchasing other items complementing each other despite having little relationship between keywords appearing in their respective names and/or advertisements (e.g., shirts and ties). Due to these and other distinctions, shopping-related behavior is often less focused than information seeking on the Internet per se. It would be desirable to provide automated selection and display of advertisements that effectively mimics, and thus takes advantage of and supports this behavior, in order to encourage purchasing.

To maximize sales, Internet Advertisers compete for Search Engine services in directing user traffic to their sites. One of the main forms of such service is provided by the Advertiser initially providing a list of keywords thought to be likely to indicate interest in the Advertiser's goods or services. The Service Provider then programs the Search Engine to display links to the Advertiser's site ("sponsored links") in a prominent location on the user's screen whenever the selected keywords appear in the user's query. Subsequently, the Provider gets paid for every visit the users make to the link. In another, less popular form of service, paid links are pasted onto the sites of some third parties having revenue-sharing agreements with the Provider ("contextual advertising"). Such third party sites are selected based on "contextual proximity" between the site and the advertisement determined with the help of special algorithms. See, e.g., Seda and Mordkovich et al, supra.

Keyword selection for Internet advertising—that is, selecting the keywords for sponsorship that will most efficiently lead to the advertiser's site—is far from obvious. It is often the case that keywords appearing to represent adequately the advertised product fail to attract users while other keywords appearing only marginally relevant succeed in attracting user traffic. In general, keyword-based advertising in the Internet is more geared towards searches for specific products, and much less supportive of poorly focused and/or opportunistic shopping. As above, it is self-apparent that substantial in-store sales volumes can be attributed to such user behavior, suggesting that potential revenue sources are untapped by existing forms of Search Engine marketing.

To take advantage of such additional revenue sources, Search Engines must relax constraints inherent in the keyword-based search, and seek to include advertisements in the search output that fail to contain the user-entered keywords but are still likely to attract the user's attention. This means that criteria other than keywords per se must be applied in construction of search outputs. However, it is apparent that to be effective, "clutter" must be reduced, that is, the display of complementary links must be limited to those that have high likelihood of attracting high volume of traffic yielding sufficiently high conversion rates. The prior art has taken some steps in this general direction. For example, Acharya et al US2005/00071741 teaches ordering results based on "search history" data, e.g. how recently various items have been updated, how often various links have been accessed, and the like.

The present invention is directed, as indicated above, to optimized selection of links to advertisements that are not directly correlated to keywords entered by the user, but which are selected and displayed responsive to analysis of the user's activities in the particular search session, and responsive to statistical analysis of the actions of all prior users in all prior searches. By selecting advertisements for display based on both the actions of the particular user in the particular session, and on the course of innumerable prior searches by different users, the method of the invention effectively incorporates both the individual searcher's particular interests as well as those of the searching population as a whole. More particularly, the method of the invention effectively incorporates the search goals of all persons interested in a particular product or class of products, such that the correlation of advertisements to keywords entered is optimized over time, such that the advertisements most likely to be relevant are displayed.

A broad-brush description of the basic steps of the method of the invention is first presented, with details of the various steps discussed in detail below.

The basic steps in the method of the invention, which involve storing of results of all prior searches as well as steps carried out on a per-session, individual user basis, and which can be carried out by software added to that run by an Internet search engine, such as Google, are as follows:

1. Prior search histories are represented in an integrated manner by maintaining a Finite State Probabilistic Automaton that 1) comprises an associative network, or History Graph, establishing probabilistic associations between a) the keywords and advertisements and b) between the advertisements in the Search Engine portfolio, such associations being derived from the history of all past interactions between the user population and the Search Engine, and 2) is capable of performing operations on the History Graph in order to compute Complementary Links, that is, links that do not contain the keywords entered by the present user but which are likely to be of interest to that user.
2. Analyzing each search carried out in a given session by a user, computing near-optimal combinations of Complementary Links, that is, combinations yielding the highest expected revenue increment for the Provider, and displaying such Complementary Links combinations in addition to the sponsored links.
3. Updating the History Graph based on the user activities in the course of the present session.
4. Preferably, partitioning the History Graph into clusters in order to improve accuracy in determining Associative Probabilities and to reduce the amount of processing required to compute the Complementary Links.

In summary, the present invention treats all advertisements as revenue-generating resources available to the Search Engine, and solves the revenue maximization problem as one of probabilistic self-adaptive resource allocation. The probabilities and other factors influencing allocations are derived from the history of searches and the revenue generating performance.

In the following we address the above steps in detail.

I. Computing and Updating Complementary Link Probabilities (CLPs).

The method of the invention will typically be carried out by a Revenue Maximization System according to the invention added to an existing search engine at a server location, such that the capabilities provided by the invention are added to those provided by the search engine, and are carried out upon each initiation of a search by a user. According to an important aspect of the invention Complementary Link Probabilities (CLPs), which effectively correlate advertisements to keywords, are computed over the history of multitudes of searches carried out by many users. The CLPs are later used in individual searches to display the optimal ads responsive to the user's query. More specifically, in a preferred embodiment, the complementary links yielding the highest expected revenue (product of the CLP and the pay-per-visit amount) are those which are displayed to the user in response to entry of keyword(s). The CLPs are later updated responsive to the user's actions, after each search session (or at intervals, whereby the updating process would be performed as a batch process, rather than individually) responsive to the histories of each search in a given session; the data employed to update the CLPs includes user-entered keywords, advertisements displayed by the Search Engine and advertisements visited by the user. Collectively, these steps amount to computing the probability (a numeric value between zero and one) that a link will be of interest to a user having entered one or more keywords, and using these probabilities to select the appropriate ads for display. In the case of sponsored links, that is, where the advertiser has agreed that a given advertisement is to be displayed whenever the corresponding keyword is entered, the CLP can be set to 1.

FIG. 1 shows schematically a Portfolio of Advertisements $A_1$-$A_M$, essentially a list of advertisements, capable of being displayed on a user's screen to enable the user to click thereon; when the user does so, he will typically be linked to the advertiser's Website, as is conventional with Web-based advertising. According to the invention, the Portfolio of Advertisements is supplied by the Advertisers to the Provider along with a List of Keywords $K_1$-$K_N$, one or more of which is contained by the corresponding advertisements. Thus, when the user enters one or more of the keywords appearing on the List, the associated advertisements are selected from the Portfolio and displayed, thus activating a "sponsored" link. However, any advertisement has a possibility of attracting the user's attention if presented among the search results responding to any keyword entry. Therefore, according to the invention, Complementary Link Probabilities $\alpha_{MN}$ are assigned to every advertisement-keyword pair, as shown in FIG. 1.

Figure 2A:
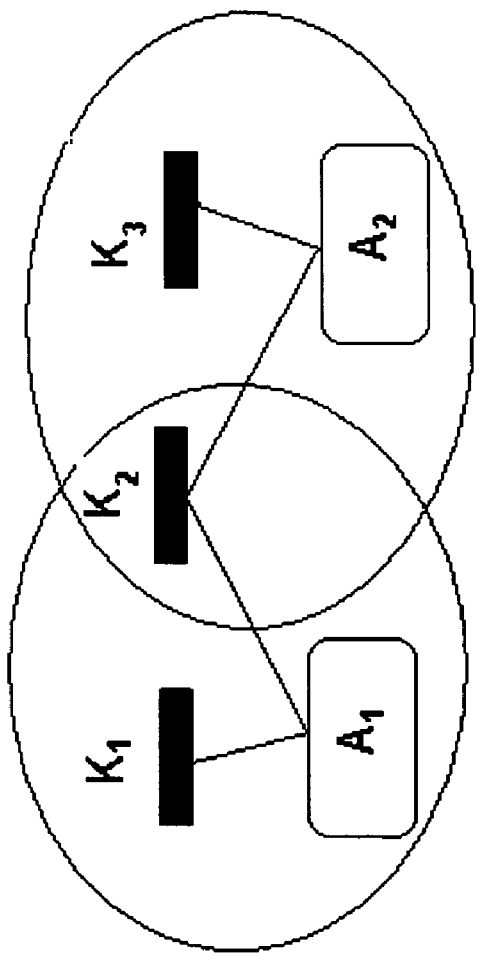
FIGS. 2*a* and 2*b*, shows schematically the overlap between Keywords sponsored with respect to different Advertisements, and the calculation of Complementary Link Probabilities (CLPs)
Figure 2B:
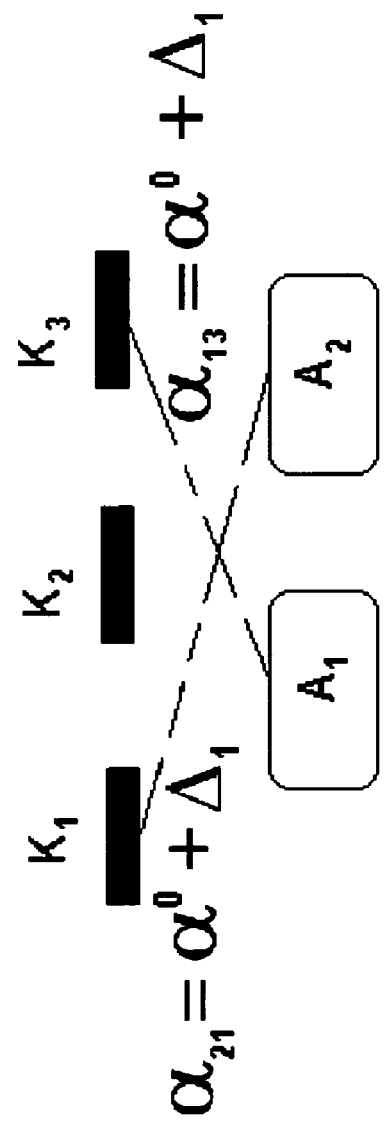

The step of computing the Complementary Link Probabilities starts by setting all CLPs to 0, and setting the CLPs for sponsored links to 1, as above. According to one aspect of the invention, the CLPs are incremented based on the search history and other factors, including a) overlapping queries and b) overlapping intent.

a) Paid advertisements have "overlapping queries" when the corresponding sponsored links use more than one sponsored keyword, and the same keywords are used by more than one sponsored link. FIG. 2a shows that advertisement $A_1$ contains sponsored (i.e., contractually defined) keywords $K_1$ and $K_2$, and advertisement $A_2$ contains sponsored keywords $K_2$ and $K_3$, creating an overlap at the keyword $K_2$. This suggests that advertisement $A_1$ may be of interest to a user whose query included keyword $K_3$, and similarly that advertisement $A_2$ may be of interest to a user inputting keyword $K_1$, FIG. 2b shows Associative Links $A_1K_3$ and $A_2K_1$ produced by the overlap, with the respective associative probabilities $\alpha_{13}$ and $\alpha_{21}$ incremented from their initial values $\alpha^0_{13}$ and $\alpha^0_{21}$ by some fixed amount $\Delta_1$, as follows:

$$\alpha_{13} = \alpha_{13}^0 + \Delta_1$$

$$\alpha_{21} = \alpha_{21}^0 + \Delta_1'$$

FIG. 3a presumes the existence of an advertisement $A_3$ containing sponsored keywords $K_1$ and $K_3$. The resulting overlaps between the three keyword sets ($K_1$, $K_2$), ($K_2$, $K_3$) and ($K_1$, $K_3$) produce a new associative link $A_3K_2$ and cause the probabilities recorded on the already existing links to be incremented, as shown in FIG. 3b.

$$\alpha_{13} = \alpha_{13}^0 + 2\Delta_1$$

$$\alpha_{21} = \alpha_{21}^0 + 2\Delta_1$$

$$\alpha_{32} = \alpha_{32}^0 + 2\Delta_1.$$

b) This invention takes advantage of the inventor's observation that consecutive search cycles in the course of a session, although using different keywords, often share some common "overlapping intent". Accordingly, two consecutive keyword entries $K_i$ and $K_h$ can be considered overlapping, allowing determination of associative links $K_iA_q$ and $K_hA_p$ and incrementing of the respective probabilities. This is shown in FIG. 4a, illustrating schematically a search sequence wherein the user enters keyword $K_i$ at step S, clicks on displayed advertisement $A_p$ at step S+1, then enters keyword $K_h$ at step S+2, clicks on advertisement $A_q$ at step S+3, and so on. These consecutive steps indicate a possible common intent underlying the user's actions; the complementary associative links are formed and their probabilities incremented accordingly, as indicated in FIG. 4b.

$$\alpha_{hp} = \alpha_{hp}^0 + \Delta_2$$

$$\alpha_{iq} = \alpha_{iq}^0 + \Delta_2$$

According to one aspect of the invention, probability increments resulting from consecutive keyword entries are valued less than those caused by overlapping queries, because in the former case the user's interest is indicated directly rather than being inferred. That is, under ordinary circumstances, the user's consecutive entries may be unrelated—the user may have shifted his focus of inquiry entirely, while in the case of overlapping queries it can be presumed that the user's broad objectives have not changed. Accordingly, the probability increments assigned to overlapping queries are more highly valued:

$$\Delta_1 > \Delta_2$$

The invention recognizes that the keyword sequences entered during search sessions may include a) sponsored keywords only, or b) a mixture of the sponsored and non-sponsored keywords, or c) non-sponsored keywords only. When non-sponsored keywords are mixed with the sponsored ones, the "overlapping intent" assumption establishes associative links with probability $\Delta_2$ between the non-sponsored keywords in the mix and advertisements linked with the sponsored keywords in the same mix. According to this aspect of the invention, the List of Keywords can be augmented to include those non-sponsored keywords, with the result that entering such non-sponsored keywords in the future searches can retrieve one of the sponsored advertisements with which the keywords became thus associated. When the user-entered keyword sequence contains no keywords from the List of Keywords, no associative links are established and/or updated. It will be appreciated by those of skill in the art that, according to this aspect of the invention, updating associative links based on the "overlapping queries" and "overlapping intent" can be conducted in many different ways as, for example, by varying the difference between the probability increments, or limiting conditions under which associative links are established, and the like. Such variations fall within the scope of this invention.

It is also within the invention to ask users to indicate whether they are initiating a new search upon entry of a particular key word; this would involve nothing but a click of a dedicated button on screen. The additional information thus provided would make the process of this invention very powerful, because it would avoid inappropriate incrementing of apparently related but actually disjoint CLPs.

Finally, when one or more of the CLPs computed in a given search exceeds some threshold $\Delta_T$ established by the Provider, the corresponding complementary links are displayed to users. The CLPs are then further updated, as follows: If the displayed complementary link is visited by the user, the CLP is incremented by a fixed amount $\Delta_3$, and decremented by the same amount if otherwise.

To summarize, Complementary Link Probabilities (CLPs) according to the invention are updated in three ways:

1) The initial probability values $\Delta_1$ are computed based on the "overlapping queries", that is, where differing ads share a keyword, a CLP connecting those two ads is incremented.

2) The probability values are incremented by $\Delta_2$ after each session, based on the "overlapping intent" assumption, that is, it is assumed that keywords entered successively are related.

3) When the complementary links are displayed, the corresponding probability values are incremented or decremented by $\Delta_3$ after each session, depending on the user's responses during that session.

The CLPs can also be incremented and decremented based on additional differing criteria that will be apparent to those of skill in the art. For example, repeated entry of a keyword in combination with other keywords can be used as a signal to increment all CLPs associated with those keywords. Such additional criteria for updating the CLPs are considered to be within the scope of the invention.

Thus, according to a first important aspect of the invention, CLPs relating ads to keywords other than sponsored keywords can be calculated and stored over the course of many searches. These stored CLPs can then be used responsive to keywords input by later users to identify and display complementary links that may be of interest to the later users, wherein the complementary links selected do not include the keywords input by the user per se.

II. Using CLP Matrices to Compute Complementary Link Sets with the Highest Expected Revenue.

FIG. 5 shows a matrix of Complementary Link Probabilities (CLPs) in which each entry $\alpha_{JI}$ represents a query satisfaction probability for advertisement $A_I$ with respect to keyword $K_J$. That is, the value $\alpha_{JI}$ in each cell is the probability that a user having entered keyword $K_J$ will visit the advertisement $A_I$ if it is displayed in the search output. In this example, M and N denote matrix size, that is the total number of ads and the total number of keywords (say, 100 ads and 1000 keywords). I and J are the running indices, say ad # 25 (i=25) and keyword # 367 (j=367).

As a result of probability updates, that is, in the course of many searches carried out by many users, the initially sparse CLP matrix is gradually populated, as illustrated in FIG. 5. In a well populated matrix, most keywords in the List of Keywords have an above-threshold probability of association with at least one complementary advertisement in the Portfolio of Advertisements, that is, each advertisement will be linked by the matrix to at least one non-sponsored but complementary keyword. Assuming the size of the complementary set displayed to the user is limited by some upper bound W, for any keyword entry $K_i$, a complementary set of not more than W links can be computed such that the Expected Complementary Search Engine Revenue $R_W(K_i)$ is maximized $$R_W(K_i) = \sum_{j=1}^{w} PPV(A_j)\alpha_{ij}\delta_{ij} \to \max$$

where w is a subset of W, w∈W, $PPV(A_j)$ is the pay-per-visit amount for the advertisement $A_j$, $\alpha_{ij}$ is the probability of visiting $A_j$ in the complementary set, $\delta_{ij}=1$ if the advertisement link $A_j$ is included into the complementary set, and $\delta_{ij}=0$ if otherwise.

Thus, according to the invention, in each search cycle not more than W candidate complementary links are computed from which a subset of w links are selected for inclusion in the search results; that is, the advertisements yielding the highest expected complementary revenue are displayed according to the result calculated for $R_W(K_i)$.

It will be appreciated by those of skill in the art that in the above equation revenue paid for a given ad ($PPV(A_j)$) is considered, i.e., so as to maximize advertising revenue rather than likelihood of selection by the user per se. It is within the scope of the invention to eliminate the step of computing revenue per ad per se and simply presume that revenue will be maximized by optimizing the results displayed to the user.

III. Computing Optimized Complements for a Series of Keyword Entries.

A series of keywords can be entered in a single query, or in a sequence of queries in the course of a session. In order to optimize the relevance of the search results, for a keyword series of length G, the calculated function $R_w$ must maximize the overall revenue yield across G columns in the CLP matrix, as follows $$R_V(K_1, K_2 \ldots K_G) = \sum_{i=1}^{G} \sum_{j=1}^{M} r_{ij}\delta_{ij} \to \max$$

where $r_{ij}$ is the expected revenue yield in the corresponding cell in the matrix, $r_{ij}=PPV(A_j)\alpha ij,$ $\delta_{ij}=1$ if link $A_j$ is included in the complementary set of n advertisements, and $\delta_{ij}=0$ if otherwise.

IV. Applying the Order of Keyword Entries to Inform Output Optimization.

Users often start searches with the keywords they consider most significant in expressing their objectives. If several objectives are pursued in the course of a session, it is natural to address the more important ones at the beginning of the search session. These natural tendencies can be accounted for when computing complementary link sets, for example, by assigning temporary increments to rows in the CLP matrix corresponding to the entered keywords, with the values of such row increments decreasing consistent with the order of entry of the successive keywords. For example, for the series of keywords $K_1, K_2, \ldots, K_G$, increments λij in the CLP matrix will be of the form $\alpha_{11}+\lambda_1, \alpha_{12}+\lambda_1, \ldots, \alpha_{1M}+\lambda_1$ $\alpha_{21}+\lambda_2, \alpha_{22}+\lambda_2, \ldots, \alpha_{2M}+\lambda_2$

...

$\alpha_{G1}+\lambda_G, \alpha_{G2}+\lambda_G, \ldots, \alpha_{GM}+\lambda_G$ with $\lambda_1 > \lambda_2 > \ldots > \lambda_G$.

As a result, functional maximization $R_m(K_1, K_2 \ldots K_G) \to \max$ will be skewed consistent with the assumed user intentions.

Alternatively, to avoid making assumptions, the user can be requested to enter keywords in the order of their subjective significance.

V. Representing Search Engine Advertising as a Finite State Probabilistic Automaton.

Following the assumption that every keyword can be associated with every advertisement, Search Engine advertising can be modeled according to the invention as a Finite State Probabilistic Automaton (FSPA, or "Automaton") that is capable of performing Operations on a History Graph in order to produce Complementary Links. The History Graph is in essence a data base storing the history of all past searches involving the Portfolio of Advertisements and the List of Keywords of interest. More specifically, according to this further important aspect of the invention, the History Graph identifies complementary links by examining the histories of many previous searches, rather than simply on the basis of overlaps existing between keywords used by various ads, as above.

To summarize, the Automaton defines a set of ordered states, or nodes, each corresponding to one of the Portfolio of paid Advertisements $A_1$-$A_M$, the nodes being associated with one another by a set of state transitions corresponding to the user's selections of paid advertisements displayed by the Search Engine in response to the user-entered keywords. The Automaton receives inputs in the form of user-entered keywords and produces outputs in the form of Complementary Links. The Advertisement currently visited is the current state of the Automaton. Switching to another Advertisement corresponds to state transition. FIG. 6 explains the notion.

Figure 6A:
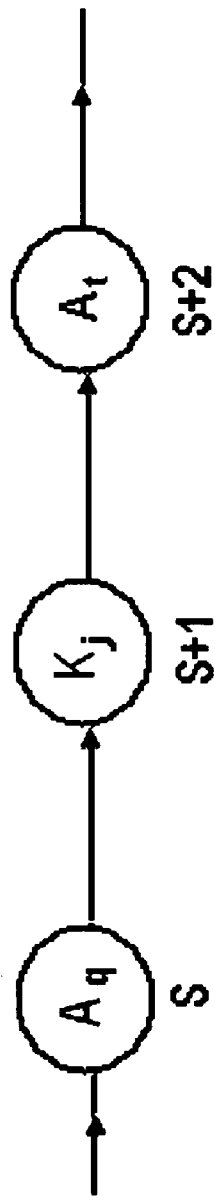
FIGS. 6*a* and 6*b*, shows schematically the modeling of the interaction between the users and the Search Engine as a Finite State Probabilistic Automaton (FSPA), which is capable of carrying out certain Operations on a History Graph identifying Complementary Links.
Figure 6B:
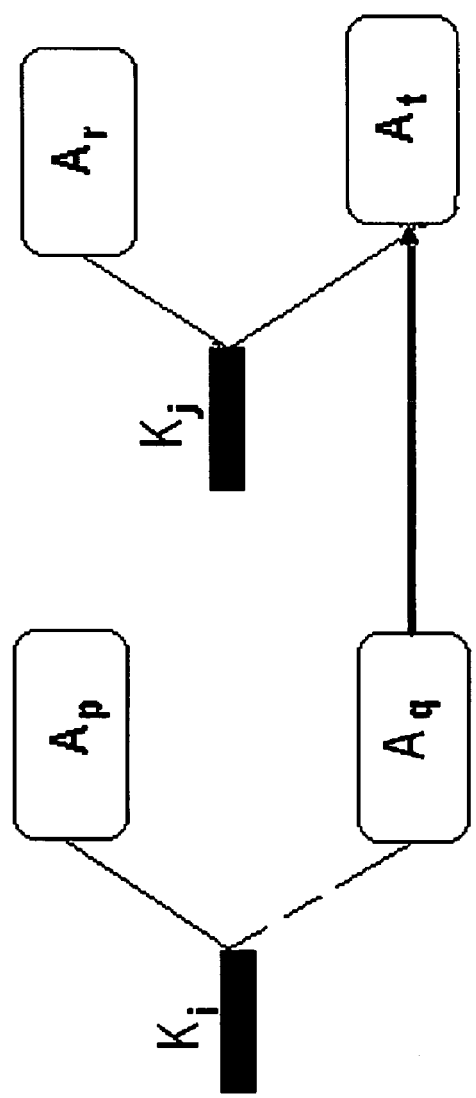

At any given state, the Automaton computes the selection of complementary ads to be displayed, if any, in addition to the sponsored ads displayed by the Search Engine; the user then chooses which displayed ads to visit, or can enter a new keyword. For example, suppose, as illustrated in FIG. 6a, the user visits advertisement $A_q$ at step S in the course of the search, then enters keyword $K_j$ at step S+1. Ad $A_t$ (or a number of ads) will then be displayed at step S+2; the user then has the choice of clicking on one of these ads, entering a new keyword, and so on. This corresponds, as shown in FIG. 6b, to the movement of the Automaton through a series of states, with the Automaton initially residing in state $A_q$ and transiting to state $A_t$—that is, displaying a link to ad $A_t$—in response to input $K_j$.

Thus, the process can be summarized as follows:

1. The user initiates a search by calling the Search Engine and entering one or more keywords.

2. The Search Engine displays any sponsored links and the Automaton displays any complementary links.

3. The user reviews the sponsored links, if any, produced by the Search Engine and the complementary links, if any, produced by the Automaton.

4. The user then selects (visits) one of the returned and displayed ads AND
   a. Returns to the display and selects another ad OR
   b. Returns to Search Engine and enters new keyword(s).

The process can go on indefinitely, as the user enters new keywords and visits new sites.

Thus it can be seen that according to the invention, entering keywords causes transitions between the ads, that is, causes transition of the Automaton from one state another, and display of one or more new ads. State transitions also take place when the user, before entering a new keyword, visits consecutively some of the simultaneously displayed links resulting from the prior keyword entry. In each state, a different set of links can be displayed. As a result, ads are represented as states by the Automaton, and links represent transitions between the states. Links are labeled by the corresponding keywords.

Thus, FIG. 7a presumes that while in state $A_p$ the user has entered a keyword $K_i$. The History Graph includes the information (as detailed below) that prior users in $A_p$ who entered keyword $K_i$ went next to nodes $A_q$, $A_r$ or $A_t$. Hence, as illustrated, these links are displayed for selection by the user.

The Automaton is termed "probabilistic" since there will usually exist a number of states that are accessible from state $A_q$ and have some non-zero visiting probability. The transition between two states in response to the user's input of a keyword—that is, the user's selecting a link to visit from a selection displayed by the Automaton in response to the keyword—establishes a probabilistic connection between them, with the connection's "weight" or "strength" $\beta_{qt}$, that is, its transition probability, incremented each time the transition takes place, $$\beta_{qt} = \beta_{qt}^0 + \mu$$

where $\beta_{qt}^0$ is the initial strength and $\mu$ is a fixed increment. The connection strengths $\beta_{qt}$ differ from the complementary link probabilities (CLPs) in that the complementary links associate ads with keywords, that is, the CLPs are probabilities (strength) of such associations, while the $\beta_{qt}$ associate ads with each other, based on the order and frequencies of visits to sequences of ads; these sequences of visits are recorded as state transitions by the automaton. The $\beta_{qt}$ are used as discussed below to fine-tune the associations between ads in the History Graph.

FIG. 7b shows that, based on the history of past interactions, every state can be associated with a number of keywords such that a) entering any of those keywords causes transition to the same next state (e.g., transition from $A_p$ to $A_q$), and/or b) entering different keywords causes transition to different states (e,g, transitions from $A_q$ to $A_f$, $A_r$ or $A_t$).

More specifically, in FIG. 7b, the bracketed lists of keywords appearing above the nodes (e.g. $K_h$-$K_x$ above node $A_p$) indicate the keywords that had been entered by earlier users prior to entering that node; that is, the bracketed information amounts to the stored results of a multitude of previous searches. This information is stored as part of the History Graph and can be used in a manner described below to anticipate the most likely course of a user's search and thus to optimize the links offered to the individual user.

Thus, in FIG. 7b, suppose the user, having arrived in node $A_p$ after having its link displayed in response to his entry of one of keywords $K_h$-$K_x$, then enters one of a different series of keywords $K_i$-$K_z$. A list of links including $A_q$ will then be displayed; if the user then in fact goes to $A_q$, and enters a key word, another set of links $A_f$, $A_r$, $A_t$ will then be displayed, and so on. The connective probabilities $\beta_{qt}$ can then be updated and used to optimize future searches. Different links can be selected in response to input of a given keyword, i.e., several different ads $A_f$, $A_r$ may be displayed in response to the same keyword $K_i$, as illustrated.

Thus, according to an important aspect of the invention, links to several sites with high probability of relevance are displayed at any given time, and the user selects which, if any, to visit next; if a further keyword is instead entered, a different set of links is displayed, having historical association between the preceding ad and keyword(s) and the new keyword. According to a further aspect of the invention discussed in the following section, the Automaton looks back at a few links preceding the current state A and compares their sequence to the present keyword sequence. This comparison, that is, considering the course of this particular search in determining which ads to show next, can narrow down the choice of plausible links.

VI. Representing User-Automaton Interaction as Graph Navigation.

Figure 8A:
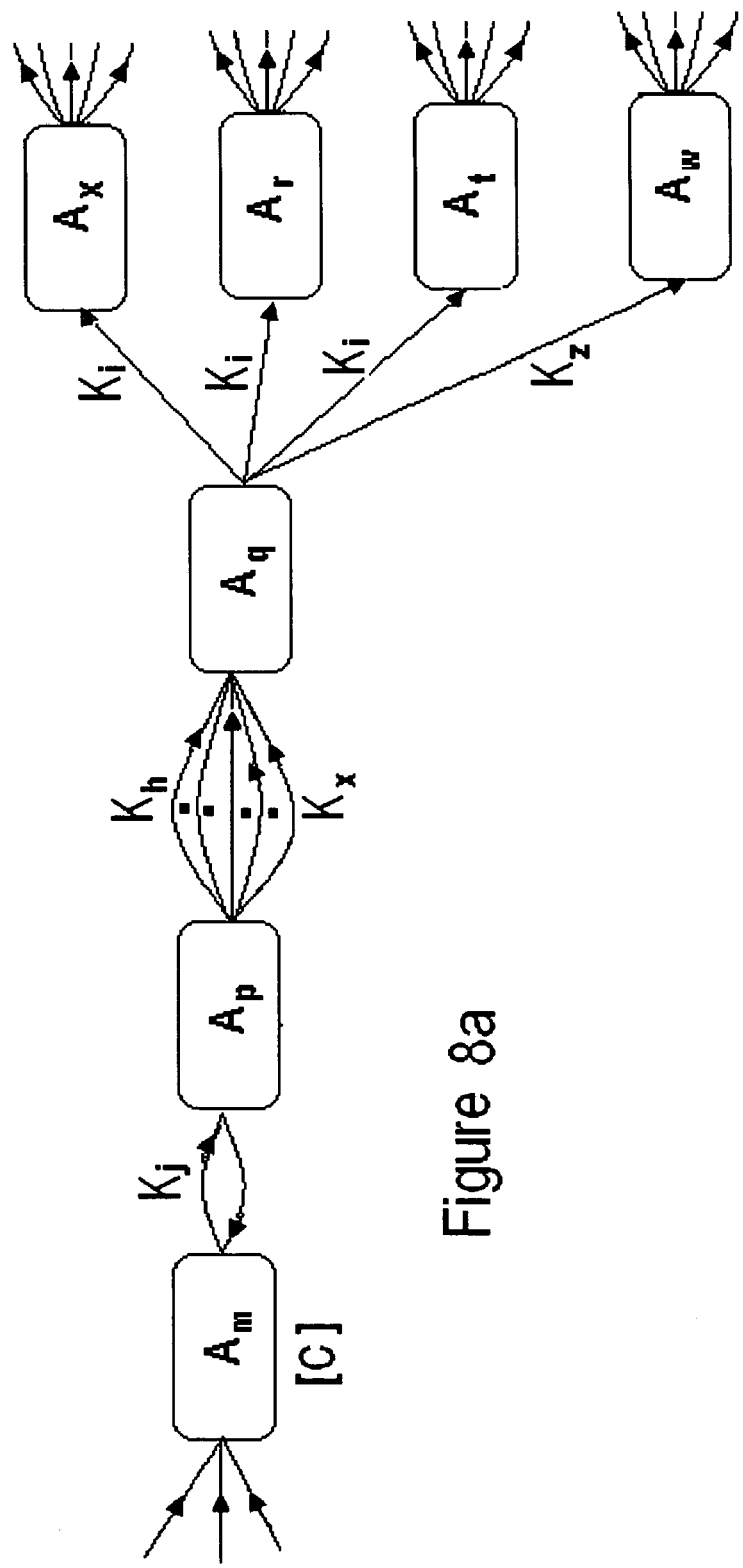
FIGS. 8*a* and 8*b*, shows schematically how the record of user—FSPA interaction can be modeled as a History Graph, which is an associative network representing a record of all past interactions between the users and the Search Engine.
Figure 8B:
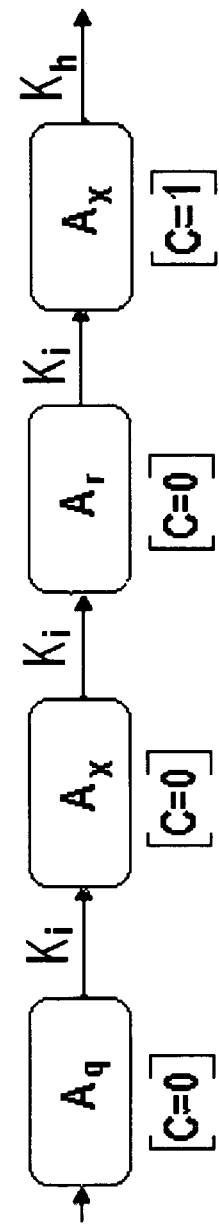

FIGS. 8a and 8b illustrate how the record of an unlimited number of user-Automaton interactions can be recorded as a directed, weighted and labeled graph, referred to herein as a "History Graph". "Directed" graphs of this type comprise a large number of ordered pairs of connected nodes, as represented by the corresponding arrows; movement takes place in the direction of the arrows. (In the usual terminology, the connections between the nodes in such graphs are termed "links"; we avoid that terminology herein in favor of "connections", to avoid confusion with the links to advertisements and other Web sites referred to herein). By contrast, no ordering relations are defined on the node pairs in "undirected" graphs. "Weighted" and "labeled" graphs have numeric weights and/or symbols (labels) associated with the graph elements (nodes and connections). Accordingly, graphs can be node-weighted, connection-weighted, and connection-and-node-weighted.

As used according to the present invention to implement the Automaton, the History Graph is essentially a data base recording the sequences of traversals between advertisements organized with reference to the keywords employed by the user both before and after each advertisement is selected; in this way the most relevant advertisements can be displayed in subsequent searches where the same keywords are input by the user. Nodes in the History Graph are labeled by, that is, correspond to the advertisements, while the connections, corresponding to traversals from one node to another following the user's entry of keywords, are labeled by the keywords and weighted according to the number of such traversals in the past, that is, as new searches take place. Thus, the History Graph is a node-labeled, connection-labeled and connection-weighted graph that is both a) effectively navigated by users as they enter keywords and select nodes to visit from among those generated by the Automaton in response to those keywords, and b) modified in response to use, due (1) to changing numeric weights responsive to actual use and (2) establishment of new associative links, e.g., when the present user visits an advertisement never previously visited following the keyword entered by the present user.

FIG. 8a shows the choices typically displayed to the user as he moves through succession of states, while FIG. 8b shows the actual sequence traversed. Thus, while in a state, e.g., $A_p$, the user may enter a keyword, e.g. $K_h$, after which a number of new ads will be displayed for selection. The user's selection of one of these new ads, by clicking on it on his screen, is referred to as a traversal. As shown in FIG. 8a, any traversal in the History Graph can be caused by different keywords (e.g., entry of any of keywords $K_h$, . . . , $K_x$ while in state $A_p$ all caused the same traversal $A_p \rightarrow A_q$), and the same keyword can entail different traversals (e.g., keyword $K_i$ may entail traversals $A_q \rightarrow A_x$, $A_q \rightarrow A_r$, or $A_q \rightarrow A_t$) depending on the present user and the past history. For example, suppose the user is looking presently at "Men's Clothes" at node $A_q$ and enters the keyword $K_i$, "rain coat;" the Automaton might then display $A_x$ "Umbrella", $A_r$ "Poncho" and $A_t$ "Jacket" links. The user might then choose to go to "Umbrella." In another search, one might enter "rain coat" while at node $A_q$ and then go to "Poncho" (i.e., same keyword but a different traversal). It is also possible that "umbrella" and "men's clothes" are connected by more than one keyword (e.g., "apparel") (i.e, the traversal is between the same nodes but via a different key word). Furthermore, several traversals can follow a single keyword entry, corresponding to users a) iterating between two advertisements via backward-forward commands (e.g., between $A_m$ and $A_p$ in FIG. 8a) and b) exploring several links before deciding on a new keyword, as indicated on the right in FIG. 8a.

FIG. 8b shows a record of user-Automaton interactions: The sequence of states $A_q$, $A_x$, $A_r$, $A_x$, connected by keywords $K_i$, $K_j$, $K_i$, $K_h$, indicates that while in state $A_q$ the user entered keyword $K_i$. In response the Automaton displayed ads $A_r$ and $A_x$; the user visited $A_x$ first, then visited $A_r$, then returned to $A_x$, before entering the next keyword $K_h$. The History Graph will record this sequence of events, in a manner detailed below, and use it in subsequent responses to similar inquiries.

Counters C attached to the nodes register the number of visits concluded by product acquisition. That is, because simply visiting an ad does not necessarily result in purchase of the advertised product, the number of visits equals or exceeds the number of "conversions", i.e., when a visitor to a site is "converted" into a buyer. The counter C registers the number of "conversions", which can then be used in one or more ways, for example, to compute rebates, based on the estimated conversion and click-through probabilities. See section IX, below, step 3. Further, as Search Engine revenues are paid by the advertisers, each advertiser typically paying an agreed upon sum for each click on his ad, and the same or a different, typically larger, sum for each purchase, the conversion count can be used to compute revenues as well. Thus, the second visit to $A_x$ resulted in a purchase, as indicated by incrementing of counter C associated with $A_x$, as shown.

The History Graphs thus represent the history of all users' past interactions with the Automaton. History Graphs are obtained by dynamically integrating multiple interaction records, as follows, and are modified by the history of the current user's interaction.

VII. Using History Graphs to Fine Tune Complementary Link Probabilities.

As discussed above in connection with FIG. 5, the value $\alpha_{ij}$ in each cell of the CLP matrix is the probability that a user having entered keyword $K_j$ will visit the advertisement $A_i$ if it is displayed in the search output. FIG. 9 shows the manner in which the CLP matrix can be mapped onto History Graphs of FIG. 8, so that each cell in the CLP matrix corresponds to a node and the connections between it and other ads in the Graph. In this way, every cell value in the CLP matrix is instantiated by a data set comprised of traversal frequencies contributing to the value for the probability, as well as the frequencies of preceding transitions throughout the history of past searches. This information can be used to improve on-line selection of complementary links, increasing their expected click-through and conversion rates.

Stated differently, the probability of the user's visiting a given link if displayed to him or her following a keyword entry can vary depending on the succession of preceding keywords and link visits during the session. Information about such dependencies is retained in the History Graph, and is used by the Automaton in generating complementary links. That is, the entries in the matrix represent the frequency of each transition, thus recording the user's reaction to previously-displayed combinations of ads. This information can be used to optimize the presentation of further ads, i.e., effectively assuming that successive searches are likely to follow the pattern of earlier searches, and statistically weighting the possible choices accordingly.

Thus, the data stored in the cells of the matrix shown in FIG. 9a shows the recorded probabilities of a user's visiting a given ad $A_1$ having entered a keyword $K_j$. Thus, if the user enters keyword $K_2$ the probability of his then visiting ad $A_1$ is $\alpha_{12}$. For example, if entering "rain coat" results in visiting "umbrellas" 15 out of 20 times the corresponding probability $\alpha$ would be 0.75. Accordingly, a link to "umbrellas" would be appropriately displayed in response to the user's entering "rain coat". According to the invention, by recording user interactions with the Automaton over multitudes of searches, such useful information is accumulated by the History Graph over time, such that an advertiser need not make any assumptions about the optimal selection of complementary ads to be displayed; instead, the Automaton accumulates and acts on actual data.

FIG. 9b shows the provision of additional information extracted from the graph that is used to further improve selection of complementary links for the current user. As above, the data stored in the matrix of FIG. 9a indicates the probability $\alpha_{12}$ of a user, having entered keyword $K_2$, then visiting ad $A_1$; e.g., entering "rain coat" as a keyword results in the user's visiting an ad including the complementary keyword "umbrella" 15 out of 20 times. The matrix of FIG. 9b (the data stored therein being determined as discussed below in connection with FIG. 10) records the history of these transitions, that is, subdivides the transitions recorded by probability $\alpha_{12}$ depending on the Ad the user was in prior to entering keyword $K_2$ The entry indicated by a capital F in every column is the sum of all elements in that column, e.g., the total number of visits to $A_1$ after entering $K_2$, while the entries including a small f have two indices, the first indicating the ad preceding $A_1$. For example, $f_{31}^{k2}$ indicates the number of times users residing in $A_3$ and entering $K_2$ then visited $A_1$ in response to display of $A_1$, $f_{41}^{k2}$ indicates the number of times users residing in $A_4$ and entering $K_2$ then visited $A_1$, and so on. This allows the Automaton to select keywords based on the histories of many prior searches. For example, suppose 13 prior users had followed the sequence "men's clothes"-"rain coat"-"umbrella", while only two followed "apparel"-"rain coat"-"umbrella." Now the Automaton knows that if the current user entered "rain coat" from "men's clothes," "umbrella" could be a good link to display, and not so good if "apparel" was the starting point."

Figure 10B:
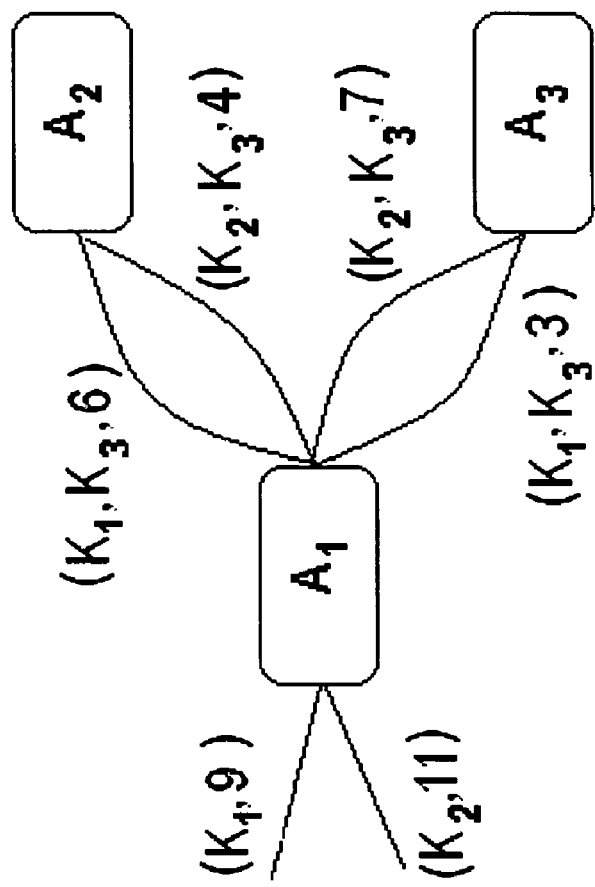
FIGS. 10*a* and 10*b*, shows schematically how information contained in the History Graph relates the probability of transitions after a particular keyword entry to the history of prior transitions.
Figure 10A:
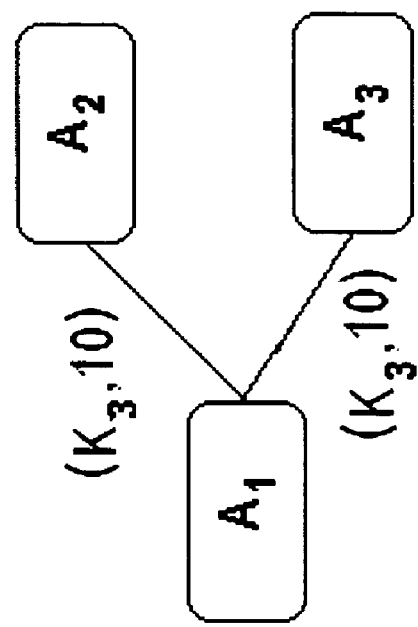

Consider an example in FIG. 10. In this Figure, the state of the Automaton is indicated in oval areas, while each keyword input by a number of users, causing the Automaton to traverse from one node to the next, and the number of such users, are indicated in parentheses, e.g., ($K_3$, 10). In the example shown in FIG. 10a, the Automaton is residing in state $A_1$ (that is, the current user is visiting link $A_1$) when the user enters keyword $K_3$. According to the History Graph as shown in FIG. 10a, the same sequence $A_1$, $K_3$ was exercised by 20 prior users who then split in two equal groups, with one group proceeding to visit link $A_2$ and the other group going to $A_3$, i.e., in response to their being displayed. Based on this information alone, $A_2$ and $A_3$ appear to be equally probable candidates for inclusion into the complementary set, so the next time the Automaton is in state $A_1$ it will display advertisements $A_2$ and $A_3$.

A further refinement is shown in FIG. 10b, whereby the Automaton can "look back" into the preceding searches as indicated by parenthetical expressions, e.g., ($K_1$, $K_3$, 6), associated with $A_2$. This "look back" reveals that of 20 prior users arriving at $A_1$, 9 having arrived via $K_1$ and 11 via $K_2$, 6 of those arriving via $K_1$ next visited $A_2$ after entering $K_3$, (as indicated by the legend $K_1$, $K_3$, 6 associated with $A_2$) while 3 next visited $A_3$, as indicated by the expressions ($K_1$, $K_3$, 3) associated with $A_3$. Similarly, out of 11 users that have arrived via $K_2$, 4 users proceeded to visit $A_2$ (as indicated by the legend $K_2$, $K_3$, 4 associated with $A_2$) while 7 other users went to $A_3$ (as indicated by the legend $K_2$, $K_3$, 7 associated with $A_3$). In this way the History Graph can store data indicating the path of keywords by which each user arrives at selection of each ad, and this information can correspondingly be used in display of ads in the future responsive to entry of the same keywords. More specifically, the Automaton can now fine tune selection of the complementary links and account for earlier choices made by the user during the session: if the user has followed the $K_1K_3$ path, $A_2$ is a better candidate; but if the user has arrived at $A_1$ via $K_2$, $A_3$ must be selected.

The concept of tracking the sequences of keywords by which past users have arrived at a particular site can be carried back as far as desirable, although, as noted below in the discussion of "performance feedback", increasing the "generations" as to which the data is saved substantially increases the computational burden, and there may also be a point at which reliability is no longer improved by increasing the amount of data thus tracked.

VIII. Partitioning History Graphs to Constrain the Use of Historic Data.

Figure 11:
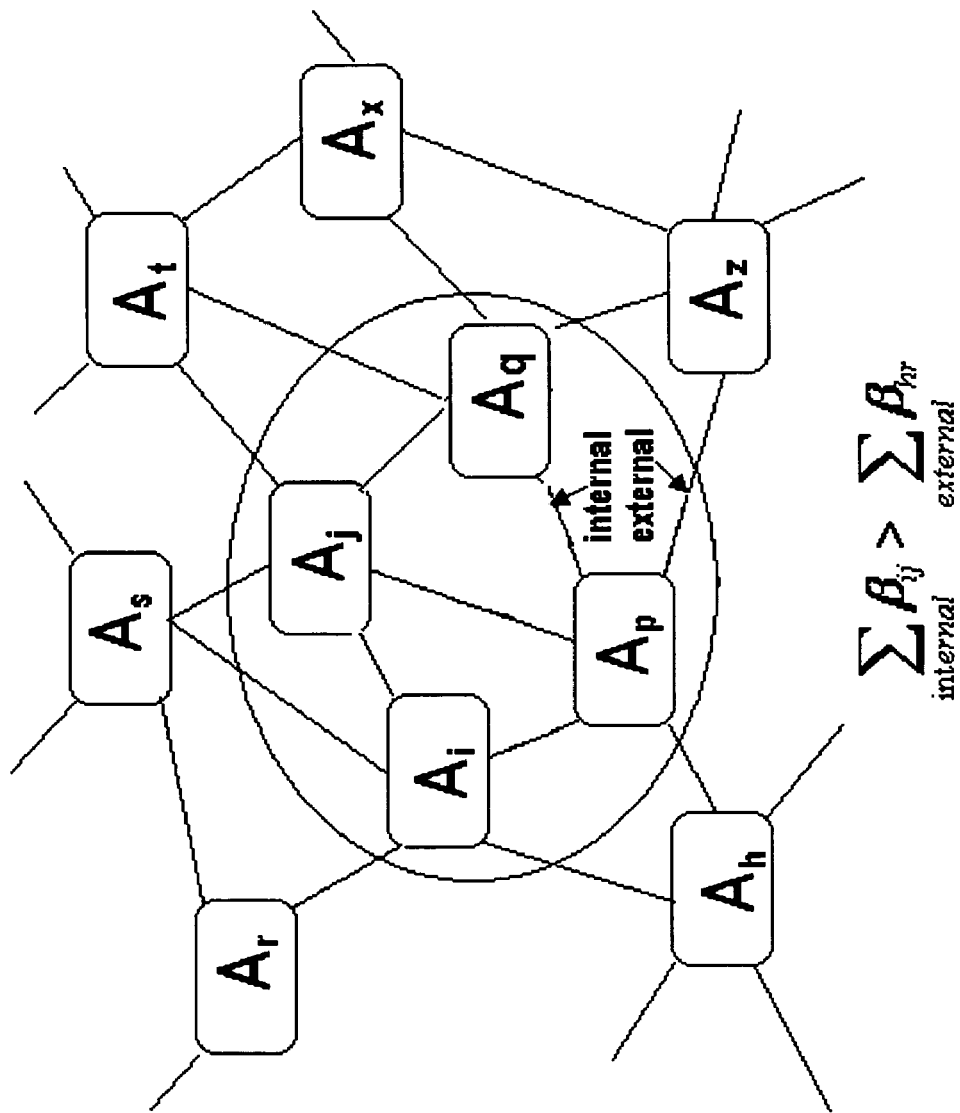
FIG. 11 shows the partition of History Graphs into cohesive and weakly-coupled clusters.

The farther apart the user entries are during the session, the lesser the dependency between them. That is, for any two user actions, the more keyword entries and site visits separate them, the farther apart they are. To take into account such dependency decline and to reduce the amount of on-line computation, History Graphs can be partitioned off-line into cohesive and externally weakly coupled clusters. The benefit is that, for any link in the cluster, dependency chains leading to that link can be interrupted at the cluster boundaries, reducing the amount of processing involved. FIG. 11 illustrates partitioning the History Graph into cohesive and weakly coupled clusters, as follows:

$$\sum_{internal} \beta_{ij} > \sum_{external} \beta_{hr},$$

That is, the clusters are identified such that the sum of composite link weights inside the cluster is larger than that of the links connecting the cluster to other clusters in the partitioning, where the composite link weight for any two nodes Ap and Aq is the sum of weights of all the links terminating in $A_p$ and $A_q$. Cluster boundaries define cutoff points in considering search histories for all the internal nodes in the cluster. For example, in the current state $A_q$ in FIG. 11, two prior steps must be considered if $A_q$ was reached via the $A_s \rightarrow A_i \rightarrow A_j \rightarrow A_q$ path, and only one step if the $A_h \rightarrow A_p \rightarrow A_q$ path was used.

More generally, conditional probabilities of the candidate links can be adjusted based on the summary strength of D edges in the History Graph corresponding to the preceding D steps in the current search $$\alpha_{ij}^* = \alpha_{ij} + \Phi \sum_D \beta_S$$

where $\Phi$ is an empirically determined coefficient, that is, performance feedback is used over time to determine how much the preceding history can be relied upon in selecting complementary links: the larger the coefficient, the greater the reliance, and $\beta_s$ is the link weight of the preceding D links, determined by the relative frequency of link traversal, as above.

In this context, "performance feedback" includes the statistics of user responses to the complementary links offered by the system (users visiting or ignoring such links). By varying the coefficient $\Phi$ and recording user responses, the system can compute a near-optimal $\Phi$ value yielding maximal increment in the frequency of user visits. Computing coefficient $\Phi$ based on the statistics of user response can be accomplished by one of skill in the art in any of a variety of ways, which are within the scope of this invention.

More specifically, the equation above allows optimization of the extent to which it is desirable to track user actions, that it, it recognizes that the further back the History Graph goes in terms of tracking the sequence of user input of keywords and selection of links, the more computation is required in order to make more reliable predictions regarding user choices (i.e., improving the probability that the current user is going to visit the complementary link the system offers). The equation above also recognizes that going too far back may not add reliability because users may not be sufficiently consistent, that is, it may be very unusual for two users to enter more than, say, the same five consecutive keywords relating to the same search purpose. Thus, "performance feedback" as used here means that the system can be configured to track data with respect to different look-back depths (one step, two steps, etc.) in order to determine the point at which the predictions become less reliable, that is, the frequency of visiting complementary links starts to go down instead of up.

IX. Using clusters to Compute Search Engine Rebates and Improve the Overall Click-Through and Conversion Rates.

All parties to Search Engine marketing benefit from increasing traffic through the Advertisement Portfolio. Users benefit from identifying potentially valuable products and services they might have overlooked, Advertisers benefit from exposure to new potential customers, and Search Engine Providers benefit from increased click-through rates. The invention benefits all three groups by its identification of advertisements likely to be of interest to users. According to one aspect of the invention, Providers are encouraged to take calculated risks and offer reduced prices or rebates for selected acquisitions, just is done in in-store shopping, in order to stimulate user traffic. The amount and timing of such rebates must ensure that the expected Search Engine revenue increment due to increased traffic over the period of rebate offering exceeds the expected total payoffs during the same period.

This invention provides a variety of methods for computing, for example, rebate offerings that will increase the Provider's revenues along with improved returns for the advertisers and improved user satisfaction. For example, rebates can be offered by the Provider when the following three conditions are met:

1. Rebates are computed dynamically, upon the user entering a well formed cluster in the History Graph, such that $$\sum_{internal} \beta_{ij} \gg \sum_{external} \beta_{hr}$$

and $$\sum_{internal} \beta_{ij} > B_1 \sum_{external} \beta_{hr} > B_2$$

where $B_1$ and $B_2$ are threshold values set large enough to ensure that relations captured in the cluster were consistently followed by a substantial number of past users, i.e., so as to ensure that the present user is likely to follow the course of a number of prior users.

2. The current user has followed one of the paths in the cluster or, at least, remained within the cluster during several steps preceding rebate offering.

3. Rebate links are selected within the cluster, based on the computed click-through and conversion probabilities, so that the expected click-through return is maximized and exceeds the expected rebate by some acceptable margin $B_3$, $$\sum_{j=1}^{w} PPV(A_j)\alpha_{ij} - \sum_{j=1}^{w} RB(A_j)L_{ij} \geq B_3,$$

where w is the number of links in the rebate set, $RB(A_j)$ is the rebate amount on $A_j$, and $L_{ij}$ is the conversion probability for the advertisement $A_j$.

Rebate amounts can be constant for all merchandise in the rebate set, or vary across the set. Users can be limited to one acquisition per set, or various combinations can be allowed. Other variations in rebate programs that can usefully be implemented using the methods of the invention to ensure that the rebate offers are seen by the most likely users can include arrangements between the Provider and the participating Advertisers for increased PPV amounts during rebate offerings, increased "instantaneous" rebate and lower "lay away" rebates for acquisitions completed within some extended time period, the Provider receiving a share of Advertiser's profit for every item sold with the help of the rebate program, and other well-known incentives to advertise and purchase.

More specifically, the invention allows rebates to be offered optimally, i.e., where there have been a number of similar purchases based on similar searches, responsive to the cluster analysis above. Rebates can also be offered where no prior purchase has actually resulted as long as the above conditions are satisfied, that is, if the clusters are strong enough. However, the link strength is incremented more after a purchase than after just a visit, so the clusters grow stronger faster after purchase and slower (more visits are needed to reach the same strength) where site visits do not result in purchase.

The following is an example of circumstances where it might be desirable to offer a rebate even where there has been no prior purchase of a particular item within the rebate cluster, that is, where other data in the cluster is sufficient for computing the expected conversion rates for that item:

Rebates are based on traffic and conversion projections derived from the past history and are offered by the Search Engine prior to purchases, first, as a means to entice users to visit the ad and, second, as a means to stimulate purchases. Rebate amounts are computed based on the probability estimates, for example as follows:

a. Assume the Advertiser pays the Provider (i.e., the proprietor of the optimized search system of the invention) $0.10 per visit responsive to display of a given ad;

b. If the Provider offers a $10 rebate for the advertised product, he can expect 1,000 more visits to the linked site, of which 5 are expected to convert (result in a purchase);

c. The Provider expects to receive 1,000*0.10=$100 from the advertiser and will pay out 5*$10=$50 to users in rebates. Expected profit: $50.

d. The Provider's profit is even better if he makes a deal with an Advertiser that if, at his discretion, the Provider offers rebates on the Advertiser's products, the cost per visit goes to, say, $0.20 (for the time the rebate program is on).

Thus, the Provider can use the information collected according to the invention concerning past history of searches and purchases to actively direct traffic in order to increase their profits.

X. Increasing User Satisfaction when Displaying Complementary Links.

Under certain circumstances it may be desirable to give the users control over their seeing complementary links, links tied to rebates, and the like. That is, normally the display of sponsored links is contractually mandated, while the display of complementary links can be made contingent on meeting, for example, the following two conditions:

1. Users explicitly agree to review complementary offerings, and can easily interrupt such reviewing at any time.

2. Complementary links have sufficiently high CLP values, that is, high probability of meeting user objectives in the current search.

The first condition can be met by providing a special "button" on the user's screen for accessing complementary links. This button might appear, for example, when the Automaton has determined that a complementary link has been identified. Further, the button might change color to indicate additional user benefits (e.g., when rebates are available). Users could then access the complementary links by depressing the button.

The second condition is met by establishing some minimal threshold $CLP_{min}$ for CLP values $$\alpha_{ij} \geq CLP_{min},$$

to be satisfied by all the complementary links displayed to the user.

XI. Facilitating User-FSPA Interaction.

Information contained in the History Graphs can be used for dual purposes: for expanding the users' attention span, that is, time spent on visiting the ads and actually paying attention to them (that is, on the assumption that, on the average, the longer one looks at the item the more interested one is in the item, so that the duration between keystrokes by the user is generally indicative of the level of interest) when reviewing complementary links, and, at the same time, obtaining performance feedback, for example, in the form of attention distribution, meaning determining whether the users look at related links. Expanded attention span allows users to visit a larger number of links while paying closer attention to them. Evaluation of the characteristics of attention distribution and other forms of performance feedback allow FSPA to fine tune link selection in the present and/or subsequent search sessions.

To expand users' attention span, complementary sets can be displayed as node clusters with "move over" access to the nodes, that is, nodes are labeled succinctly (e.g., by keywords, as in FIG. 8), with the advertisement text appearing only when the user moves the cursor over the corresponding node. The relative amounts of time the user spends in reviewing and/or visiting nodes (attention distribution over the cluster) is indicative of tacit user preferences. This information can be used in constructing complementary sets in the course of the present session, or in the subsequent sessions with the same user. Stated differently, the assumption is made that the longer the user dwells on a label, the more potentially interested he is in the subject; accordingly, the relative dwelling times can be captured by the systems and used to prioritize complementary links.

XII. Using History Graphs to Inform Advertisers and Optimize Contextual Placement.

Advertisers can use the information gathered according to the invention concerning typical search sequences to optimize their advertising and marketing practices, e.g., can analyze the results of searches resulting in purchases to select contractual keywords conforming to the user's actual selection of keywords when searching for particular goods. More specifically, the keyword labels on links incident to a node in the History Graph indicate the range of keywords resulting in visiting the node. This information can be used by both the advertiser and the Search Engine Provider, to fine tune keyword selection and improve advertisement payoff.

The same information can be used to vary contextual placements on the node, based on the preceding keyword entries.

XIII. System for Search Engine Revenue Maximization.

Figure 12:
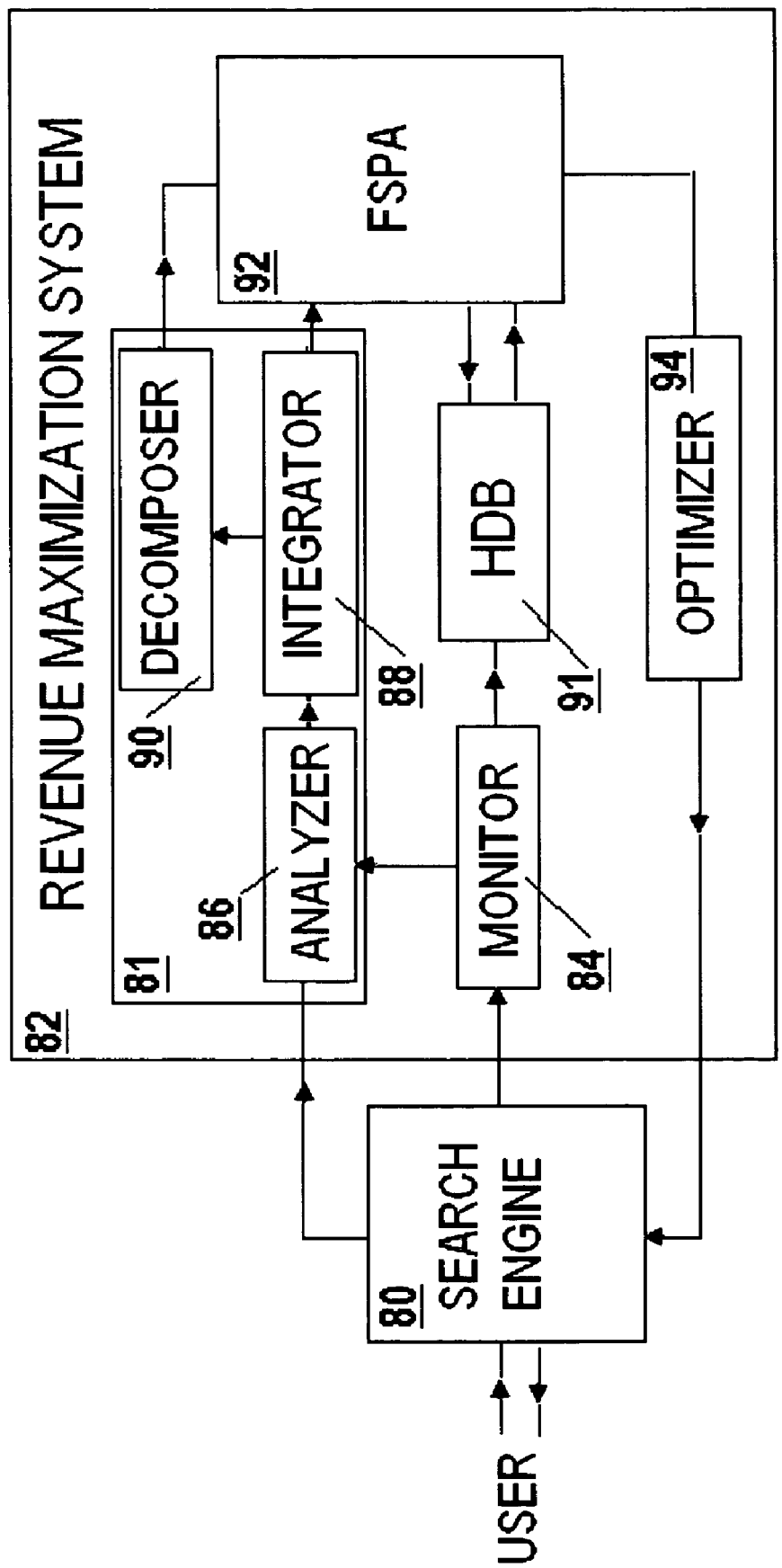
FIG. 12 shows the principal software components of a Search Engine Revenue Maximization System (RMS)

FIG. 12 shows schematically the principal software components of a Revenue Maximization System 82 according to the invention ("RMS"), including the functional modules discussed below.

The User interacts with the RMS System 82 via a Search Engine 80; as indicated above, the Search Engine 80 can be an existing search engine such as Google, to which the RMS System 82 is added, e.g. at a server site.

The MONITOR module 84 generates records of user-Search Engine interactions, including the order of keyword entries, composition of Search Engine outputs (sponsored and complementary links), and user actions (ignoring links, visiting links, visiting and acquiring merchandise).

The ANALYZER module 86 updates keyword-advertisement probabilities based on the interaction records, and computes the initial probability estimates based on the overlap of keywords. That is, in the implementation of the invention discussed in detail herein, but to which the invention is not to be limited, the ANALYZER module 86 calculates the CLPs responsive to data provided by the MONITOR module 84.

The INTEGRATOR module 88 synthesizes individual interaction records into a unified History Graph, and updates weights and labels associated with the Graph components, responsive to the CLPs calculated by the ANALYZER module 86.

The Historic Data Base (HDB) module 91 contains the history data in the form of the History Graph. That is, the History Graph is a data structure, or file, while the HDB is a software module that contains it.

The DECOMPOSER module 90 partitions the History Graphs synthesized by the INTEGRATOR module 88 into internally cohesive and externally weakly coupled clusters.

The FINITE STATE PROBABILISTIC AUTOMATON (FSPA) module 92 receives records of on-going interactions from the MONITOR module 84, dynamically maps such records on the History Graph synthesized by the INTEGRATOR module 88, and generates complementary sets, that is, sets of complementary links.

The OPTIMIZER module 94 analyzes complementary sets generated by the FSPA module 92, computes revenue-maximizing combinations of complementary links, determines rebate options, and formats search outputs.

Computations conducted by the FSPA and OPTIMIZER modules 92 and 94, respectively, are suitable for parallel distributed processing, i.e., real-time processing during preparation of a response to individual user entries, of keywords, for example. As indicated by box 81, by comparison, the ANALYZER, INTEGRATOR and DECOMPOSER modules 86, 88, and 90, respectively, are desirably operated in off-line mode, because their computations reflect the results of many searches carried out by many users; that is, the History Graph might be updated on an hourly or daily basis.

Figure 13:
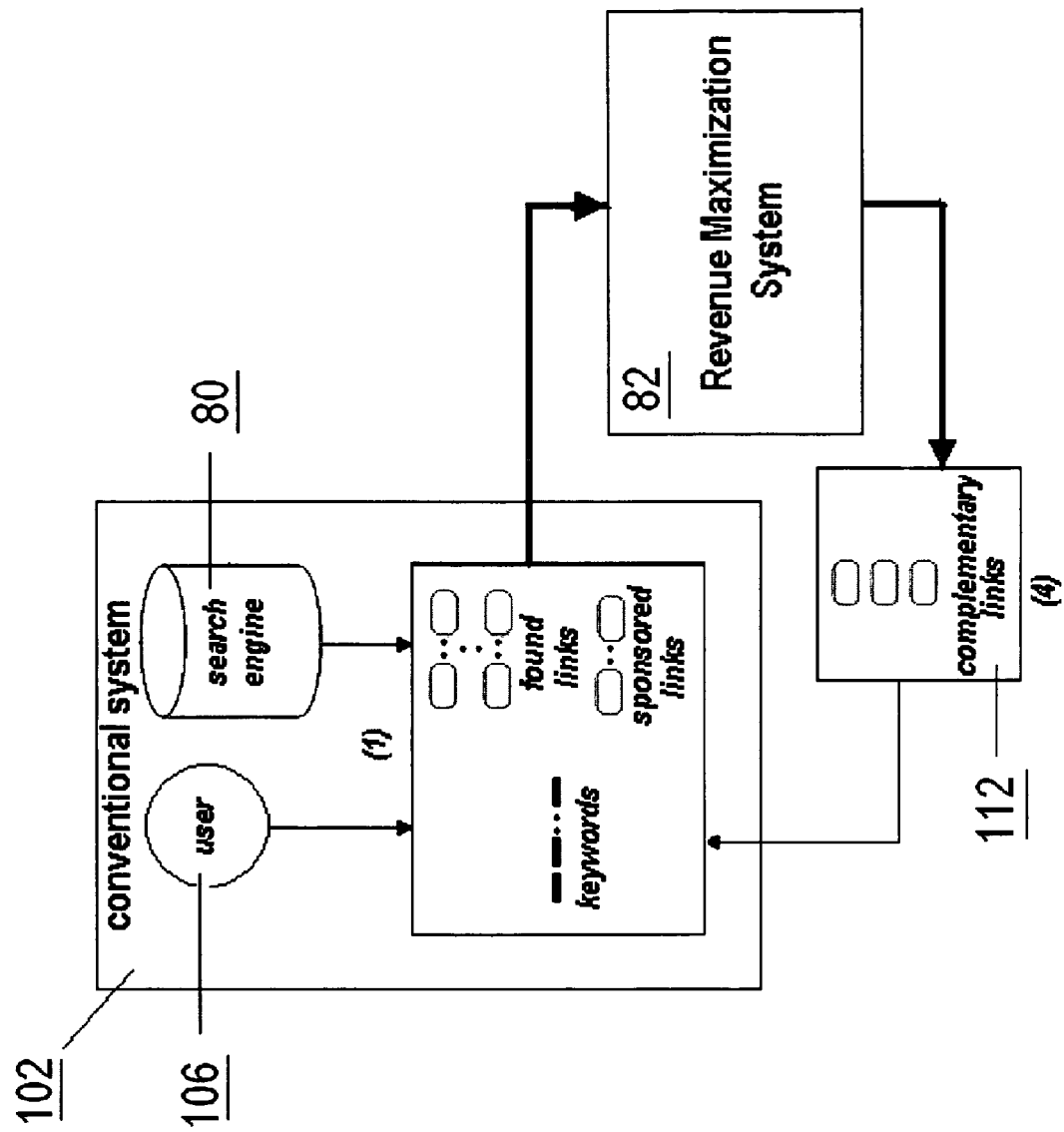
FIG. 13 shows how the components of the RMS can be added to a conventional search engine.

FIG. 13 shows a schematic diagram illustrating the manner in which the principal components of software implementing the invention can be cooperatively added to an existing search engine, and FIGS. 14-17 show flowcharts schematically depicting sequences of typical steps to be carried in implementing the key processes implementing the invention, as described above.

As illustrated schematically by FIG. 13, the Revenue Maximization System 82 according to the invention can be effectively implemented as an "add-on" to a conventional search system 102, including a Search Engine, e.g., Google, at 80, that is, the Revenue Maximization System 82 according to the invention can be configured as additional software run by the same server as the Search Engine 80. In the conventional system 102, the Search Engine 80 receives the keywords from the user at 106 and generates a list of links determined to be relevant to the user query (found links), and another list of links purchased by the advertisers (sponsored links). The user reviews such lists, and chooses which links to visit and which to ignore.

According to the present invention, the conventional system 102 is augmented by the Revenue Maximization System (RMS) 82 in order to produce additional links (complementary links) 112 expected to satisfy tacit user objectives that are not expressed directly in the user entered keywords but can be derived therefrom according to the invention, using data relating to prior searches that is stored in the History Graph. As discussed in connection with FIG. 12, the RMS 82 comprises software components which collectively, based on the historic record in the History Graph, establish probabilistic associations between all the purchased keywords and all the advertisements in the Search Engine Portfolio, and for the succession of user entered keywords in the current interaction session, generates groups 112 of complementary links maximizing the expected Search Engine revenue in that session. Revenue maximization is attained because the optimal selection of the complementary links results in a high probability of the user's visiting the links as well as high price-per-visit; that is, optimal selection of the complementary links according to the invention results in a good probability that the user will find what he or she is looking for and purchase it.

As discussed above, according to the invention sponsored Keywords and corresponding Advertisements are supplied by the advertisers; the system of the invention uses search histories to determine association probabilities between keywords and advertisements. FIGS. 14-17 show high-level flowcharts illustrating key steps in the process of the invention.

Figure 14:
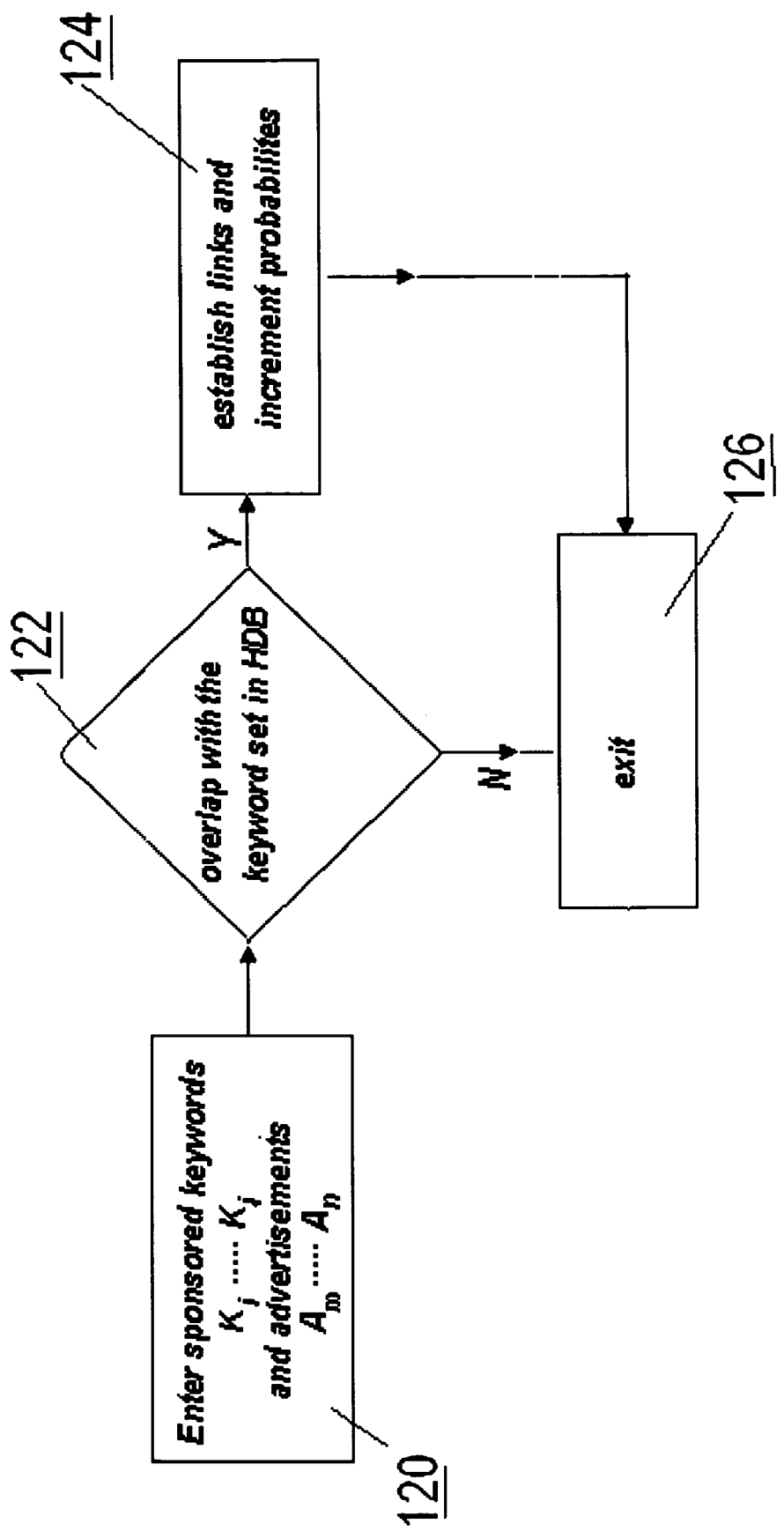
FIG. 14 shows the principal steps in establishment of the associative links between keywords and advertisements.

FIG. 14 illustrates schematically how sponsored keywords and the corresponding advertisements are added to the Search Engine Portfolio, and how associative probabilities therebetween are established and updated. As described above, according to the invention when new sponsored keywords and the corresponding advertisements are entered into the Portfolio at step 120, a matrix (see FIG. 5) is created providing an entry for each possible combination of keywords and advertisements. Probabilistic associative links between keywords and advertisements in the Advertisement Portfolio are then established, as follows:

1. The RMS 82 searches the HDB at step 122 to identify overlaps (as described above with respect to FIGS. 2 and 3) between the newly entered keywords and the already existing keyword set, and
2. For the identified overlaps, the Revenue Maximization System (RMS) 82 establishes links between the keywords and advertisements within such overlaps, and increments the probabilities at step 124.

Figure 15:
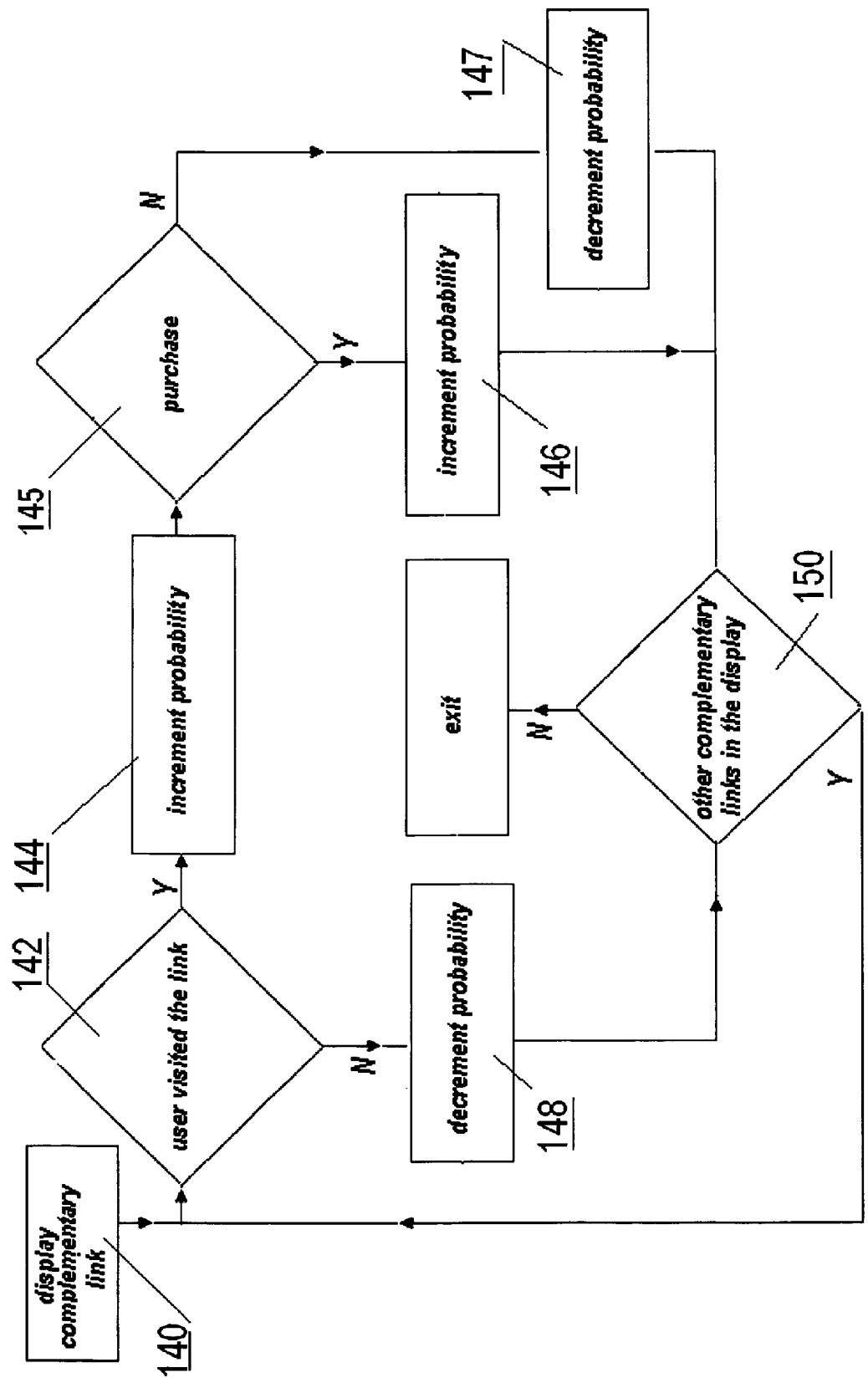
FIG. 15 shows the principal steps in updating link probabilities after each search session.

FIG. 15 illustrates schematically the manner in which the complementary link probabilities (CLPs) relating each sponsored ad to one or more keywords are updated after each search session involving generation and display of complementary links (a search session can conclude without such generation due to absence of links in the HDB having sufficiently high probabilities, or due to the user's refusal to view the links). Assuming a complementary link is displayed to the user at 140, the corresponding CLP is updated as follows:

1. If the user visits the link at 142, the link probability is incremented at 144.
2. If visiting a link is followed by a purchase at 145, the link probability in incremented again at 146; otherwise, the probability is decremented at 147 by the same or a different increment.
3. If a displayed link is ignored by the user (not visited), the link probability is decremented at 148.
4. The process is repeated if there are additional complementary links on the display, as indicated at 150.

Figure 16:
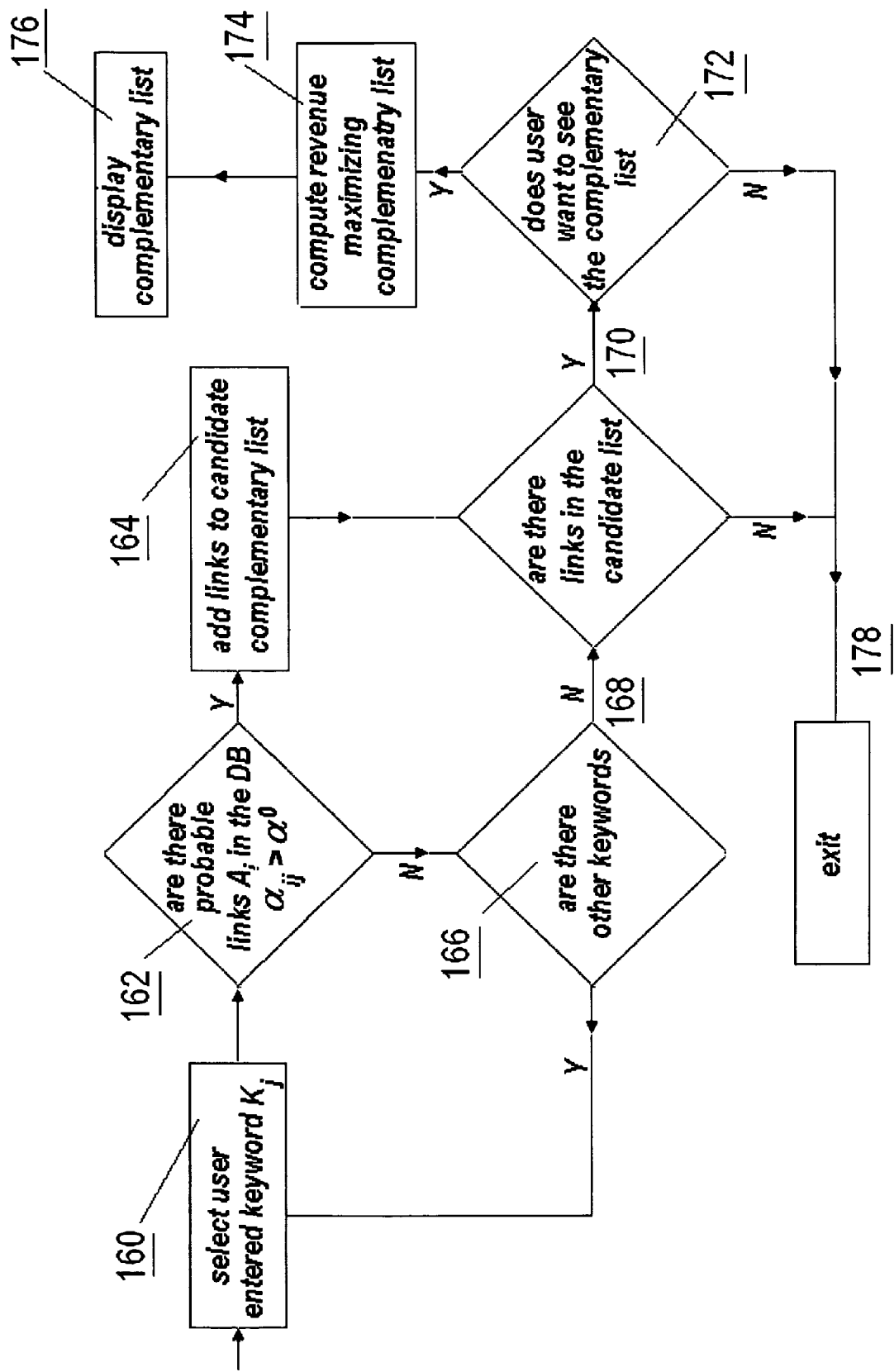
FIG. 16 shows the principal steps in the interaction between the user and RMS.

FIG. 16 shows schematically the principal steps in the interaction between the user and the Revenue. Maximization System 100 (FIG. 12) of the invention, and shows the manner in which associative probabilities are used to compute near-optimal combinations of complementary links, that is, to identify and display links to advertisements that are statistically likely to be of interest to the user despite containing none of the user-entered keywords, and making such complementary links available in addition to the sponsored links.

Each user query (a series of keywords) is analyzed by the Finite State Probabilistic Automaton (FSPA) one keyword at a time, as follows:

1. For every keyword $K_j$, entered by a user at 160, the HDB is checked at 162 to determine whether it holds links to advertisements $A_i$, $A_m$ associated with $K_j$ despite the absence of $K_j$ in their texts and, if so, whether the probabilities of such links $\alpha_{ij}$, $\alpha_{mj}$ ... are sufficiently high, that is, exceed some minimal threshold $\alpha^0$.
2. If such probable links are present in the HDB, FSPA adds them at 164 to the list of candidate complementary links held temporarily at the HDB. Otherwise, FSPA proceeds to analyze the next keyword, at 166.
3. Steps 1 and 2 are repeated until the query is exhausted, at 168.
4. If the candidate list is not empty, as indicated at 170, the user's consent is optionally requested before display of complementary links, at 172.
5. If the user agrees, FSPA computes a subset of the candidate list (e.g., typically of not more than 5 items) maximizing the expected revenue over the candidate list, at 174, and displays it at 176. Otherwise, the system exits at 178. As discussed above, the user's response to display of the complementary links is then used to update the Historic Data Base.

This process can display complementary links for keywords in the current query, or for all the keywords entered by the user from the beginning of the present session (excluding those already displayed during the session).

Figure 17:
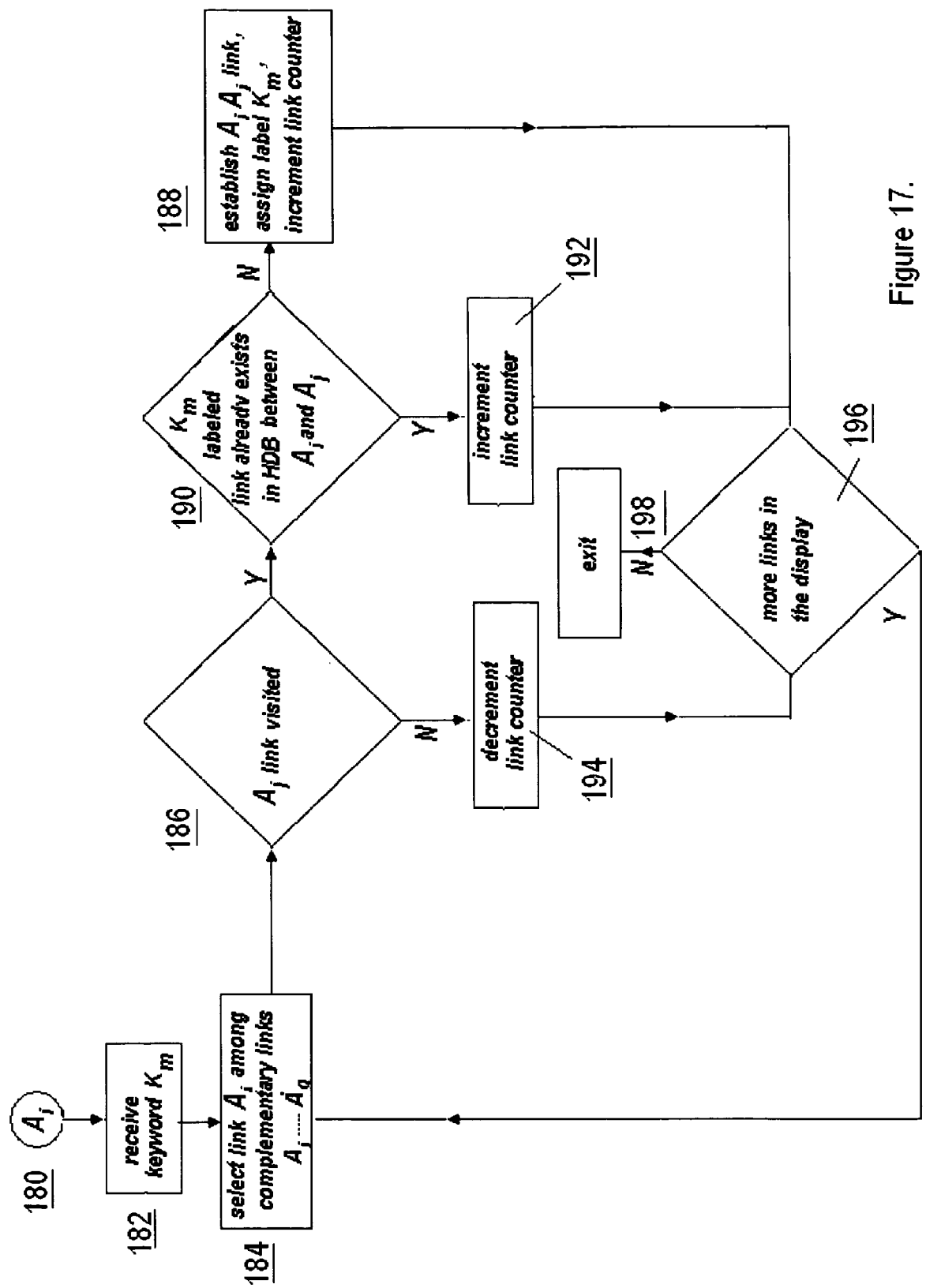
FIG. 17 shows the principal steps in accumulation of integrated records of search session in the Historic Data Base.

Finally, FIG. 17 shows schematically how the integrated search histories are represented as a network. More specifically, the HDB accumulates an integrated record of search sessions, in the form of a network where nodes represent advertisements (sites) in the Advertisement Portfolio, and keyword-labeled connections represent consecutive user choices when visiting those ads. For example, a $K_m$ labeled connection between sites $A_i$ and $A_j$ represents the user entering keyword $K_m$ after having visited site $A_i$, and then choosing site $A_j$ for the next visit. The network is expanded and updated as follows:

1. During each search session, RMS forms a temporary record in HDB containing user-entered keywords, complementary links displayed after each such entry, and user choices in visiting the links.

2. In off-line mode, the temporary record is analyzed with the result that either new labeled links are established in the network, or link traversal counters are incremented or decremented, as shown schematically in FIG. 17.

More specifically, suppose while visiting site $A_i$, as indicated at 180, the user entered keyword $K_m$ at 182 and then chose site $A_j$ from a list of complementary links displayed at 184, visiting $A_j$ at 186. A new $K_m$ connection is established between nodes $A_i$ and $A_j$ in the HDB, at step 188, if the sequence $A_i$-$K_m$-$A_j$ has occurred for the first time in the search history. If the link already exists in the network, as determined at 190, the link counter is incremented by unity at 192. If the link already exists but the $A_i$-$K_m$-$A_j$ sequence has not been completed in the current session (that is, the user does not visit $A_j$), the counter is decremented at 194. If no more complementary links have been displayed, as determined at 196, the system exits at 198. Otherwise, it returns to 184.

While a preferred embodiment of the invention has been described in detail, the invention is not to be limited thereby; the invention is limited only by the following claims.

What is claimed is:

1. A method for selecting and displaying links to paid advertisements of an advertiser selected from a portfolio of such advertisements in response to a user inquiry, said method comprising the steps of:

in a server device operated by a search engine service provider, establishing a data base containing an associative network comprising probabilistic associations between each advertisement in the portfolio and each keyword in a list of keywords, such that in response to entry of a particular keyword contained in the list by a user at a remote client device, complementary links to advertisements are displayed to the user at the remote client device which do not contain the particular keyword but still have substantial probability of being visited by the user and recognized as relevant to the search objectives;

in a server device operated by a search engine service provider, representing integrated search histories as an associative network, in which associative probabilities for the entire portfolio of advertisements and the list of keywords are stored and updated according to the actions of all users, such that each user's input during a given search session becomes part of the overall record of searches, and is thus used to optimize all future searches similarly;

in a particular search session, initiated by a user at a user device, using such probabilistic associations stored by said data base and said associative probabilities stored by said associative network at a server device to compute near-optimal combinations of complementary links responsive to a user entering a keyword by way of said user device, wherein said complementary links and the corresponding advertisements do not contain user-entered keywords but still have substantial probability of being visited by the user and recognized as relevant to the search objectives, and identifying the complementary links offering the highest expected revenue for the search engine service provider based on the compensation paid by the advertiser to the search engine service provider and the probability of the user visiting the link in response to a particular search and displaying the identified complementary links offering the highest expected revenue for the search engine service provider to the user at the user device.

2. The method of claim 1 comprising the further step of computing initial probabilistic associations between paid keywords and advertisements in the portfolio based on query overlap, wherein such overlaps are identified when the same keywords are associated with more than one advertisement.

3. The method of claim 1 comprising the further step of computing initial probabilistic associations between user-entered keywords and advertisements in the portfolio based on intention overlaps, wherein such overlaps are identified responsive to entry of consecutive keywords by the user in the course of a particular search session.

4. The method of claim 1, comprising the further step of analyzing the histories of recent searches carried out in a particular search session and updating the list of keywords and associative probabilities between the keywords and advertisements in the portfolio responsive to said analyzing step.

5. The method of claim 1, comprising the further step of partitioning the associative network into clusters in order to improve accuracy in determining associative probabilities and to reduce the amount of processing required to compute the complementary links.

6. The method of claim 1, comprising the further step of determining the complementary link probabilities, determined as the probabilities of users visiting complementary advertisements.

7. The method of claim 6, comprising the further step of using matrices of complementary link probabilities to improve search engine revenues, by computing near-optimal combinations of complementary links offering the highest cumulative complementary link probabilities and/or the highest expected pay-per-view revenues.

8. The method of claim 1, comprising the further step of applying the order of keyword entries during search sessions to infer the user's priorities and to apply such priorities to improve optimization results.

9. The method of claim 1, wherein said step of selecting and displaying links to optimal advertisements is performed using a Finite State Probabilistic Automaton (FSPA) comprised of augmented associative networks, or History Graphs, including the steps of:

a) representing integrated search histories as augmented associative networks, or History Graphs in which nodes represent advertisements and directed connections between nodes represent user transitions between the nodes, b) assigning weights to the nodes based on the characteristics of user activities when visiting the nodes, c) assigning weights to the connections based on the relative frequencies of traversal, and d) mapping user entries of keywords and user selections of links during search sessions onto History Graphs and computing complementary link probabilities based on such mappings, and wherein said step of computing near-optimal combinations of complementary links responsive to a user entering a keyword is performed using the complementary link probabilities thus computed to identify complementary links for display to the user at the user device.

10. The method of claim 9, wherein the computational burden of FSPA modeling is reduced by performing the further steps of:

partitioning the History Graph into cohesive clusters comprising groups of nodes connected by relatively heavily-weighted connections, where connection to nodes outside the clusters are relatively lightly weighted; and using such clusters to improve results and expedite execution when computing near-optimal combinations of complementary links in response to user queries.

11. The method of claim 10, wherein user traffic and the resulting revenues are increased by performing the further steps of offering monetary or other incentives to users by computing rebate amounts for sales of products responsive to advertisements in such clusters and offering such rebates when the expected revenue increment due to increased traffic inside the cluster exceeds the expected amount of rebate payoffs.

12. The method of claim 11, wherein rebates are offered by displaying cluster contents to users entering clusters, and offering rebates for purchases inside such clusters.

13. The method of claim 10, comprising the further step of increasing revenues by improving conversion rates in selected advertisements, by:

a) identifying link subsets inside History Graph clusters having the highest complementary link probability, b) offering increased rebates to users entering and completing purchases inside such subsets, and c) making arrangements with the corresponding advertisers such that their expected payments to the Search Engine provider exceed the expected amount of rebate payoffs.

14. The method of claim 1, comprising the further step of using the comparative duration of link visits during search sessions, to augment selection of complementary links in the current and/or subsequent sessions by the same user.

* * * * *